(12) United States Patent
Onaka et al.

(10) Patent No.: US 11,625,383 B2
(45) Date of Patent: Apr. 11, 2023

(54) INFORMATION PROCESSING APPARATUS, INFORMATION PROCESSING METHOD, AND PROGRAM

(71) Applicant: Sansan, Inc., Tokyo (JP)

(72) Inventors: Masamune Onaka, Tokyo (JP); Kazushige Morimoto, Tokyo (JP)

(73) Assignee: Sansan, Inc., Tokyo (JP)

( * ) Notice: Subject to any disclaimer, the term of this patent is extended or adjusted under 35 U.S.C. 154(b) by 63 days.

(21) Appl. No.: 17/125,916

(22) Filed: Dec. 17, 2020

(65) Prior Publication Data

US 2021/0191917 A1 Jun. 24, 2021

(30) Foreign Application Priority Data

Dec. 19, 2019 (JP) .............................. JP2019-228914

(51) Int. Cl.
*G06F 16/00* (2019.01)
*G06F 16/23* (2019.01)
(Continued)

(52) U.S. Cl.
CPC ........ *G06F 16/2358* (2019.01); *G06F 16/245* (2019.01); *G06Q 10/10* (2013.01)

(58) Field of Classification Search
CPC ...... G06Q 30/06; G06Q 20/12; G06Q 20/382; G06Q 20/027; G06Q 20/0855; G06Q 20/401; G06Q 20/1235; G06Q 10/10; G06Q 20/04; G06Q 20/123; G06Q 30/0601; G06Q 30/0641; G06Q 20/367; G06Q 40/04; G06Q 50/18; G06Q 50/184; G06Q 40/00; G06Q 50/188; G06Q 20/202; G06F 21/10;
(Continued)

(56) References Cited

U.S. PATENT DOCUMENTS

| | | | | |
|---|---|---|---|---|
| 9,070,088 B1* | 6/2015 | Baveja | ................... | G06N 20/00 |
| 2010/0323729 A1* | 12/2010 | Chitsey | ................... | H04L 67/02 |
| | | | | 455/466 |
| 2014/0126825 A1* | 5/2014 | Luo | ..................... | G06V 30/418 |
| | | | | 382/190 |

FOREIGN PATENT DOCUMENTS

JP 2014153939 A 8/2014

* cited by examiner

*Primary Examiner* — Yicun Wu
(74) *Attorney, Agent, or Firm* — McDermott Will & Emery LLP

(57) ABSTRACT

In order to solve a problem of conventional information processing apparatuses in that effort and time are required to check relationships between business cards and anti-social forces, and the check result is likely to be different for each person in charge, an information processing apparatus includes: a business card information accepting unit that accepts business card information regarding a business card; an anti-social information acquiring unit that searches for information regarding an anti-social force contained in an anti-social check database, using an identifier regarding the business card information accepted by the business card information accepting unit, thereby acquiring anti-social information based on a search result; and a relationship information output unit that outputs relationship information indicating a relationship between the business card and the anti-social force based on the acquired anti-social information. Accordingly, it is possible to easily and reliably check relationships between business cards and anti-social forces such that overlooking is unlikely to occur.

12 Claims, 14 Drawing Sheets

(51) Int. Cl.
*G06Q 10/10* (2023.01)
*G06F 16/245* (2019.01)

(58) Field of Classification Search
CPC ............. G06F 21/6218; G06F 2221/07; G06F 16/2358; G06F 16/245; G06F 21/34; G06F 9/4406; G06F 16/24578; G06F 21/316; G06F 40/30; G06F 40/40; G06F 40/44; G06F 40/47; G06F 40/49; G06F 40/51; G06F 40/58
See application file for complete search history.

| # | Organization name | Organization ID | Country ID | Anti-social information |
|---|---|---|---|---|
| 001 | Company AAA | G2121 | JP | Anti-society |
| 002 | ABZ Company | G4223 | US | Not anti-society |
| 003 | Company BBB | None | JP | Not anti-society |
| . | . | . | . | . |
| . | . | . | . | . |
| . | . | . | . | . |

FIG.9

| Business card ID | User ID | Full name | His/her organization | Organization ID | Country ID | Address |
|---|---|---|---|---|---|---|
| C0012 | U0221 | Yamada ○○ | Company AAA | G2121 | JP | — — — — |
| C0023 | C0202 | Yoshida ■■ | ABZ Company | G4223 | US | — — — — |
| C2015 | C0129 | Sakamoto ▲▲ | Limited Company CCS | G1561 | JP | — — — — |
| C2212 | C0521 | Yamamoto ○○ | Company BBB | G5522 | JP | — — — — |
| C0012 | C0221 | Sakaguchi ○○ | Company AAA | G2121 | JP | — — — — |
| ° | ° | ° | ° | ° | ° | ° |

| Anti-social information | Relationship information | Designation information | Transaction history |
|---|---|---|---|
| Anti-society | Related | Related (transaction NG) | · |
| Not anti-society | Not related | Not related (transaction OK) | · |
| Not anti-society | Not related | Not related (transaction OK) | · |
| Not anti-society | Not related | Related (transaction NG) | · |
| Anti-society | Related | Related (transaction NG) | · |
| ° | ° | ° | ° |

FIG.10

Transactions are not allowed
(there is a possibility of belonging to an anti-social force).

Company AAA

Company AAA
 Address ○○○○○○
 Telephone number ○○○○○○○○
 President ○○○○
 URL ○○○○○○

People concerned

Yamada ○○   2019/02/21 Met by U0221
 Sakaguchi ○○  2019/04/12 Met by U0221

Transaction information

Client risk evaluation

| To be evaluated / Already evaluated | Transaction NG list |

There is a possibility that the companies indicated on the business cards scanned by your colleague are marked companies with a risk in future transactions.

See the found marked company candidates, and evaluate the transaction risk.

[Edit all]  [Input company name]  [Search]

|  | Status | Company name | Remarks |
|---|---|---|---|
| Save / Cancel | ○ Transaction NG  ● Transaction OK | Company ASDFG | Input check results and judgement reasons |
| Edit | [!] 3 Candidates | qwyui Company | |
| Edit | [!] 4 Candidates | UIOP Company | |
| Edit | [!] 4 Candidates | ZXCVB Company | |

FIG.12

INFORMATION PROCESSING APPARATUS, INFORMATION PROCESSING METHOD, AND PROGRAM

CROSS REFERENCE TO RELATED APPLICATION

This application claims the benefit of Japanese Application No. 2019-228914, filed on Dec. 19, 2019, the entire contents of which is hereby incorporated by reference.

BACKGROUND OF THE INVENTION

1. Field of the Invention

The present invention relates to an information processing apparatus, an information processing method, and a program for accepting business card information regarding a business card.

2. Description of Related Art

Conventionally, there is an information processing apparatus for acquiring information indicated on a business card, based on an image of the business card (see JP 2014-153939A, for example).

Incidentally, in recent years in which compliance is required for activities of organizations such as companies, it is important to reliably perform check (anti-social check) as to whether or not the other party with which a person belonging to an organization exchanged business cards is an organization related to a so-called anti-social force (which may be abbreviated as "anti-society (anti-social)"). However, such anti-social check has to be manually performed by a person in charge of the check based on a name or the like of an organization of the other party, and is problematic in that it is difficult to perform the check without overlooking, and effort and time are required.

SUMMARY OF THE INVENTION

A first aspect of the present invention is directed to an information processing apparatus including: a business card information accepting unit that accepts business card information regarding a business card; an anti-social information acquiring unit that searches for information regarding an anti-social force contained in an anti-social check database, using an identifier regarding the business card information accepted by the business card information accepting unit, thereby acquiring anti-social information based on a search result; and a relationship information output unit that outputs relationship information indicating a relationship between the business card and the anti-social force based on the acquired anti-social information.

With this configuration, it is possible to easily and reliably perform anti-social check in which overlooking is unlikely to occur.

Furthermore, a second aspect of the present invention is directed to the information processing apparatus according to the first aspect, wherein the anti-social information contains information indicating a relationship between an organization to which a person indicated on the business card belongs and the anti-social force.

With this configuration, it is possible to output relationship information indicating a relationship between an organization to which a person indicated on a business card belongs and anti-social forces.

Furthermore, a third aspect of the present invention is directed to the information processing apparatus according to the first or second aspect, wherein the organization identifier, the anti-social information, an organization name, and a country identifier for specifying a country corresponding to an organization are stored in association with each other in the anti-social check database, and the anti-social information acquiring unit makes an inquiry to the anti-social check database using a first query containing the organization identifier, and, in a case in which anti-social information corresponding to the organization identifier is not acquired through the inquiry using the first query, the anti-social information acquiring unit generates a second query containing an organization name and a country identifier acquired based on the business card information, and acquires anti-social information corresponding to the organization name and the country identifier contained in the anti-social check database, using the generated second query.

With this configuration, it is possible to reliably perform anti-social check, regardless of spelling inconsistencies or the like in the business card information.

Furthermore, a fourth aspect of the present invention is directed to the information processing apparatus according to the third aspect, wherein an organization identifier, anti-social information, an organization name that is an attribute value, and a country identifier for specifying a country corresponding to an organization are stored in association with each other in an anti-social check database, the anti-social information acquiring unit makes an inquiry to the anti-social check database using a first query containing the organization identifier, and, in a case in which anti-social information corresponding to the organization identifier is not acquired through the inquiry using the first query, the anti-social information acquiring unit generates a second query containing an organization name and a country identifier acquired in advance based on the business card information, and acquires anti-social information corresponding to the organization name and the country identifier contained in the anti-social check database, using the generated second query.

With this configuration, it is possible to more reliably perform anti-social check in which overlooking is unlikely to occur.

Furthermore, a fifth aspect of the present invention is directed to the information processing apparatus according to any one of the first to forth aspects, wherein a personal identifier, which is code for identifying a person, and the anti-social information are stored in association with each other in the anti-social check database, and the anti-social information acquiring unit acquires a personal identifier for identifying a person indicated on the business card, from the business card information, generates a query containing the acquired personal identifier, and acquires anti-social information corresponding to the personal identifier contained in the anti-social check database, using the generated query.

With this configuration, it is possible to reliably perform anti-social check, regardless of spelling inconsistencies or the like in the business card information.

Furthermore, a sixth aspect of the present invention is directed to the information processing apparatus according to any one of the first to fifth aspects, wherein the relationship information output unit is configured to output the relationship information to a user, and the information processing apparatus further includes: a designation information accepting unit that, in a case in which the relationship information output unit outputs the relationship information to the user, accepts input of designation information, from the user, indicating a relationship between the business card and an anti-social force, and associates the designation information with an identifier regarding business card information corresponding to the relationship information; and a designation information accumulating unit that accumulates the designation information, and the business card information accepted by the business card information accepting unit or information corresponding thereto in association with each other in a storage unit, based on the identifier associated with the designation information accepted by the designation information accepting unit.

With this configuration, it is possible to accumulate user's check results.

Furthermore, a seventh aspect of the present invention is directed to the information processing apparatus according to the sixth aspect, wherein the information processing apparatus further includes: an output request accepting unit that accepts input of output request information, from the user, requesting output of the business card information accepted by the business card information accepting unit or information corresponding thereto, and associates the accepted output request information with an identifier regarding the business card information; a stored information acquiring unit that acquires, based on the identifier associated with the output request information accepted by the output request accepting unit, the designation information and the business card information or information corresponding thereto corresponding to the identifier, from the storage unit; and a stored information output unit that outputs the business card information or information corresponding thereto acquired by the stored information acquiring unit, in a form that conforms to the designation information acquired by the stored information acquiring unit.

With this configuration, it is possible to output, to a user, business card information or information corresponding thereto, in a form that conforms to a relationship between a business card and an anti-social force.

Furthermore, an eighth aspect of the present invention is directed to the information processing apparatus according to the sixth or seventh aspect, wherein the stored information acquiring unit can acquire a piece of the designation information, and the identifier regarding the business card information corresponding to the designation information, from the storage unit, and the information processing apparatus further includes: an anti-social information re-acquiring unit that acquires the anti-social information contained in the anti-social check database, using the identifier regarding the business card information acquired by the stored information acquiring unit, when a predetermined check time has arrived; and a change notification information output unit that, in a case in which a relationship indicated by relationship information that can be output by the relationship information output unit based on the anti-social information acquired by the anti-social information re-acquiring unit is different from a relationship indicated by the designation information, outputs change notification information indicating that effect.

With this configuration, if the relationship information changes (if the status changes), it is possible to receive a notification indicating that effect.

Furthermore, a ninth aspect of the present invention is directed to the information processing apparatus according to any one of the first to fifth aspects, wherein the information processing apparatus further includes: a relationship information accumulating unit that accumulates the relationship information output by the relationship information output unit and an identifier regarding business card information corresponding to the relationship information in association with each other in a storage unit; a stored information acquiring unit that acquires a piece of the relationship information, and the identifier regarding the business card information corresponding to the relationship information, from the storage unit; an anti-social information re-acquiring unit that acquires the anti-social information contained in the anti-social check database, using the identifier regarding the business card information acquired by the stored information acquiring unit, when a predetermined check time has arrived; and a change notification information output unit that, in a case in which a relationship indicated by relationship information that can be output by the relationship information output unit based on the anti-social information acquired by the anti-social information re-acquiring unit is different from a relationship indicated by the relationship information acquired by the stored information acquiring unit, outputs change notification information indicating that effect.

With this configuration, if the content of the anti-social information changes, it is possible to receive a notification indicating that effect.

With the information processing apparatus according to the present invention, it is possible to easily and reliably check relationships between business cards and anti-social forces such that overlooking is unlikely to occur.

BRIEF DESCRIPTION OF THE DRAWINGS

FIG. 9 is a diagram showing a specific example of part of information that is recorded in an anti-social check database in the embodiment.

FIG. 10 is a diagram showing an example of information that is stored in a business card information storage unit in the information processing apparatus in the embodiment.

FIG. 11 is a diagram illustrating a specific example of an output result through an anti-social check function using the information processing apparatus in the embodiment.

FIG. 12 is a diagram illustrating a specific example of a designation screen for accepting input of designation information output by the information processing apparatus in the embodiment.

DETAILED DESCRIPTION OF THE INVENTION

Figure 1:
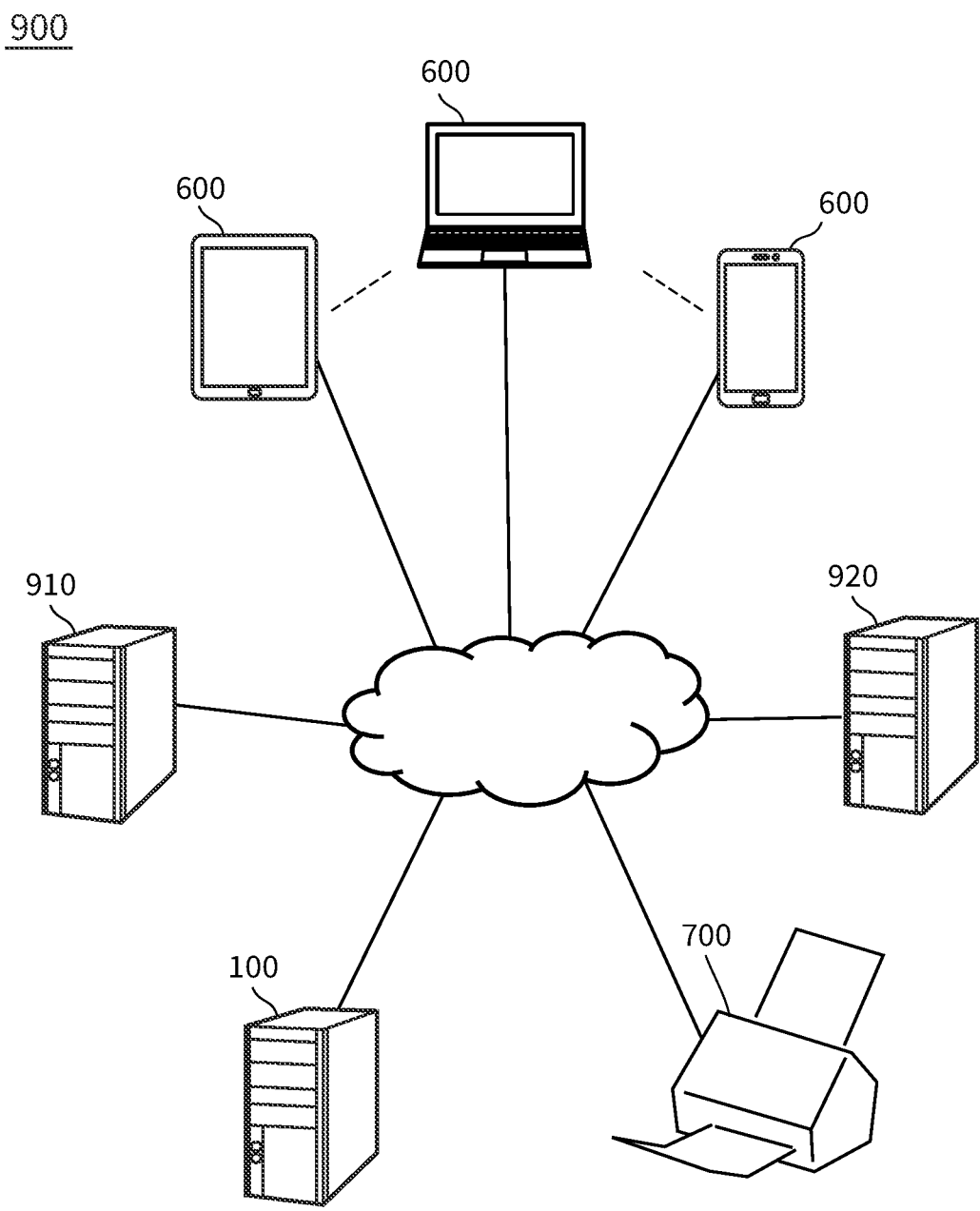
FIG. 1 is a block diagram of an information processing system according to an embodiment.

Hereinafter, an embodiment of an information processing apparatus and the like will be described with reference to the drawings. It should be noted that constituent elements denoted by the same reference numerals in the embodiments perform similar operations, and thus a description thereof may not be repeated.

The terms used in a description of the embodiments are generally defined as follows. However, the meanings of the terms are not always to be interpreted as follows, and, for example, if they are individually described in the following embodiments, they are to be interpreted in consideration of the description as well.

Business card information is information regarding a business card indicating at least one of information on a person, information on an organization to which a person belongs, and information on an organization. The business card information may contain, for example, each of various types of information such as a full name of a person indicated on a business card, a name of an organization to which a person belongs, a job title, and contact information, and other types of information, or may not contain one or more of these types of information. The business card information may be any information that is contained in a business card. The business card may be either a tangible business card, or a business card that is computer-processable electronic information and can be used instead of a tangible business card.

Information corresponding to business card information is, for example, client management information or the like generated from a collection of other types of information regarding a person or an organization indicated by the business card information, as well as the business card information, but there is no limitation to this. Examples of the other types of information regarding a person or an organization indicated by the business card information include information regarding a transaction history and a communication history, and information regarding an organization, but there is no limitation to this.

In the description below, business card information and information corresponding thereto may be collectively referred to as business card information or the like.

Anti-social information is information regarding various anti-social forces, and is, for example, information regarding whether or not one organization is an organization related to an anti-social force. The anti-social information may be information regarding whether or not one person is related to an anti-social force. The anti-social information may be information indicating whether or not one organization or person belongs to an anti-social force, a value indicating a level or possibility of one organization or person being considered as being related to an anti-social force, or the like, or may be information in other various forms. The anti-social information may be a flag, or information in a numeric value, a character string, or the like.

Relationship information is information indicating a relationship between a business card and anti-social forces. That is to say, the relationship information can be considered as being information indicating a relationship between business card information and anti-social forces. For example, the relationship information may be information indicating whether or not there is a relationship between business card information and anti-social forces, or information indicating a possibility of there being a relationship between business card information and anti-social forces. The relationship information may be a flag associated with an identifier for specifying business card information, or information in a numeric value, a character string, or the like associated with an identifier for specifying business card information. The state in which a transaction with an anti-social force is not allowed in general societal terms, and there is relationship information indicating that there is a relationship between business card information and anti-social forces can be said to be a state in which there is a certain level of risk in a transaction with a person or an organization indicated by the business card information. The relationship information may be anti-social information itself.

Designation information is information input by a user and indicating a relationship between a business card and an anti-social force. That is to say, the designation information can be considered as being information designated by a user and indicating a relationship between business card information and an anti-social force. For example, if a prohibited matter is set that prohibits a transaction with one person or one organization because the person or organization belongs to an anti-social force, the prohibited matter can be considered as being designation information. The designation information may be a flag associated with an identifier for specifying business card information, or information in a numeric value, a character string, or the like associated with an identifier for specifying business card information.

Acquiring may encompass acquiring an item input by an operator or the like who operates an apparatus or a system, or acquiring information stored in another apparatus. The acquiring information stored in another apparatus may encompass acquiring information stored in another apparatus via an API or the like, or acquiring information through scraping or the like on the content of a document file (including the content of a web page) provided by another apparatus. It may also encompass acquiring information based on original information, in a format different from that of the original information, such as acquiring information through optical character recognition on an image file.

Furthermore, the information may be acquired using a so-called machine learning technique. The machine learning technique may be used, for example, as follows. That is to say, a learning device in which a specific type of input information is taken as input and a type of output information that is to be acquired is taken as output is configured using a machine learning technique. For example, two or more pairs of input information and output information are prepared in advance, and a learning device is configured by giving the two or more pairs of information to a module for configuring a learning device of machine learning, and is accumulated in a storage unit. The learning device can also be said to be a classifier. There is no limitation on the machine learning technique, and examples thereof include deep learning, random forest, SVR, and the like. As the machine learning, for example, functions in various machine learning frameworks such as fastText, tinySVM, random forest, or TensorFlow, or various existing libraries may be used.

Selecting or deciding on information is a concept that encompasses acquiring information, acquiring a link to information, and establishing a flag regarding information.

Outputting information is a concept that encompasses display on a display screen, projection using a projector, printing by a printer, output of a sound, transmission to an external apparatus, accumulation in a storage medium, and delivery of a processing result to another processing apparatus or another program. Specifically, for example, it encompasses enablement of information to be displayed on a web page, transmission as an email or the like, and output of information for printing.

Accepting information is a concept that encompasses accepting information input from an input device such as a keyboard, a mouse, or a touch panel, receiving information transmitted via a wired or wireless communication line from another apparatus or the like, and accepting information read from a storage medium such as an optical disk, a magnetic disk, or a semiconductor memory.

Updating various types of information stored in an information processing apparatus or the like is a concept that encompasses changing stored information, adding new information to stored information, and deleting a part or the whole of stored information.

Embodiment 1

In this embodiment, an information processing apparatus accepts business card information regarding a business card, generates a query containing an identifier regarding the business card information, using the business card information, searches for information regarding an anti-social force contained in an anti-social check database, using the generated query, thereby acquiring anti-social information based on a search result, and outputs relationship information based on the acquired anti-social information. In this embodiment, the anti-social check database is a database in which an organization identifier, which is code for identifying an organization to which a person indicated on the business card belongs, and anti-social information are accumulated in association with each other, and the query contains the organization identifier.

The information processing apparatus can output the business card information or the like to a user. The business card information or the like can be output, for example, to a terminal apparatus or the like used by the user. In this case, the information processing apparatus can output relationship information together with the business card information or the like, and, accordingly, the user can see whether or not the business card information or the like is related to an organization or the like related to an anti-social force.

The anti-social check database may be, for example, a database in which an organization identifier, an attribute value that is anti-social information, an organization name, and an attribute value for specifying a country in which the organization is located are accumulated in association with each other. In this case, in the case in which an inquiry for anti-social information using a first query containing the organization identifier fails, the information processing apparatus may generate a second query containing an organization name and information for specifying a country of the organization based on the business card information, and acquire anti-social information corresponding to the organization name and the information for specifying a country of the organization contained in the anti-social check database, using the generated second query. The anti-social check database may be a databased in which a personal identifier, which is code for identifying a person indicated on the business card, and an attribute value that is anti-social information are accumulated in association with each other, and, in this case, it is sufficient that the query contains the personal identifier.

Furthermore, the information processing apparatus may accept designation information indicating a relationship between an organization or a person and an anti-social force, the information being input by a user who received relationship information, and accumulate the business card information or the like and the accepted designation information in association with each other in a storage unit. The information processing apparatus may output the business card information or the like in a form that conforms to the designation information, in response to an output request from a user. The users who can input the designation information may be limited to administrative users with predetermined privileges. The information processing apparatus may store accepted business card information, and acquire anti-social information using a query generated using the stored business card information, when a predetermined time has arrived, and, in the case in which the relationship information regarding the business card information is different from the designation information, the information processing apparatus may output notification information indicating that effect. Hereinafter, an information processing system 900 according to this embodiment will be described.

FIG. 1 is a block diagram of the information processing system 900 according to this embodiment.

As shown in FIG. 1, in this embodiment, the information processing system 900 includes a reading apparatus 700, a first external apparatus 910, a second external apparatus 920, an information processing apparatus 100, terminal apparatuses 600, and the like. The apparatuses can communicate with each other, for example, via a network such as a local area network or the Internet. The configuration of the information processing system 900 is not limited to this. There is no limitation on the number of apparatuses that are included in the information processing system 900, and other apparatuses may be further included in the information processing system 900.

In FIG. 1, for example, a portable information terminal apparatus such as a so-called smartphone, an information terminal apparatus of a tablet type, a personal computer (PC) such as a laptop computer, and the like are shown as the terminal apparatuses 600, but those that can be used as the terminal apparatuses 600 may be any of the above-mentioned apparatuses, or may be apparatuses other than those mentioned above. A user of the information processing system 900 can use the information processing system 900, by using a terminal apparatus 600. In the following examples, a description will be given assuming that a so-called personal computer having a keyboard, a display, and the like is used as the terminal apparatus 600, but there is no limitation to this.

Figure 2:
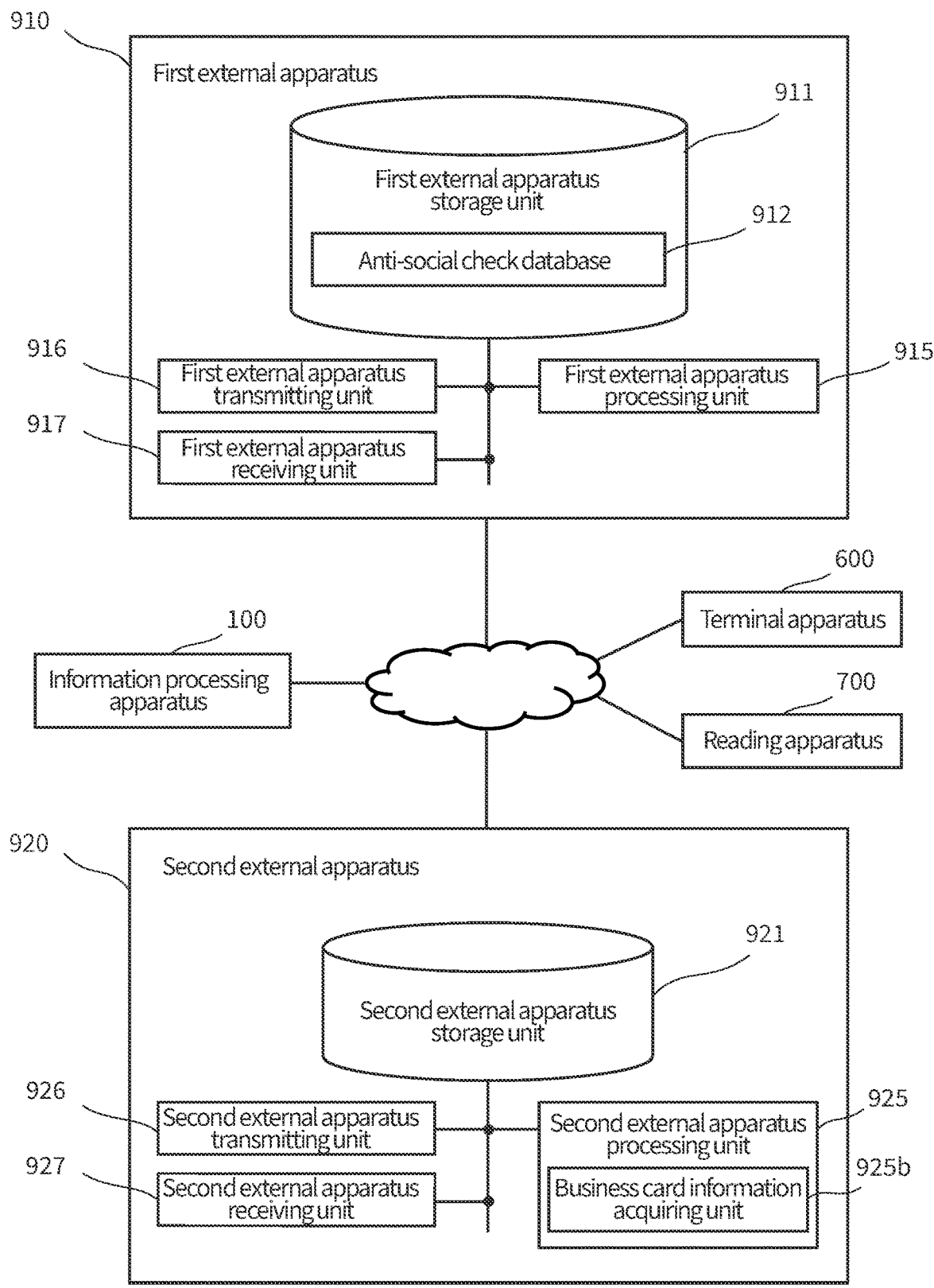
FIG. 2 is a block diagram of the information processing system in the embodiment.
Figure 3:
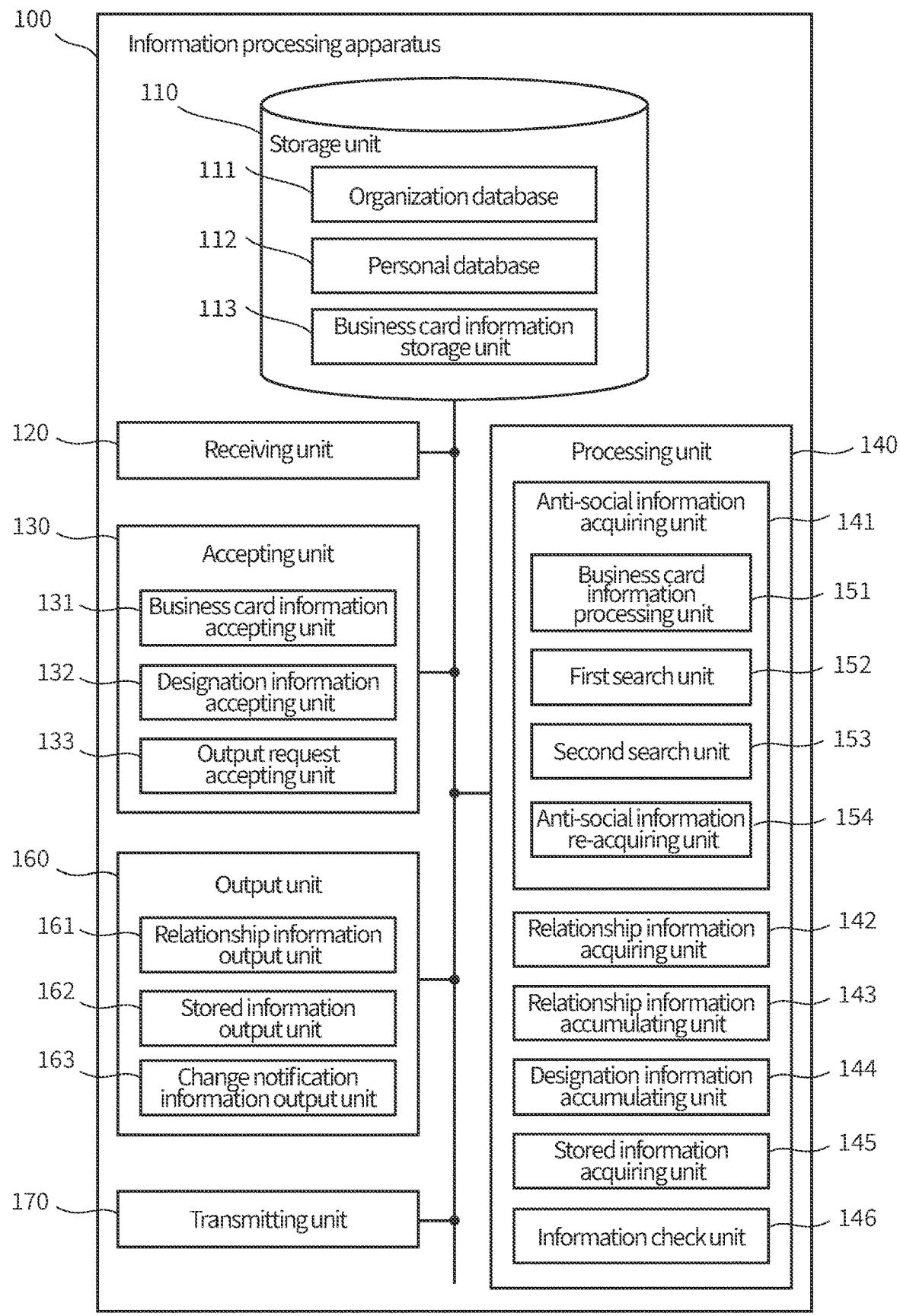
FIG. 3 is a block diagram of an information processing apparatus in the embodiment.
Figure 4:
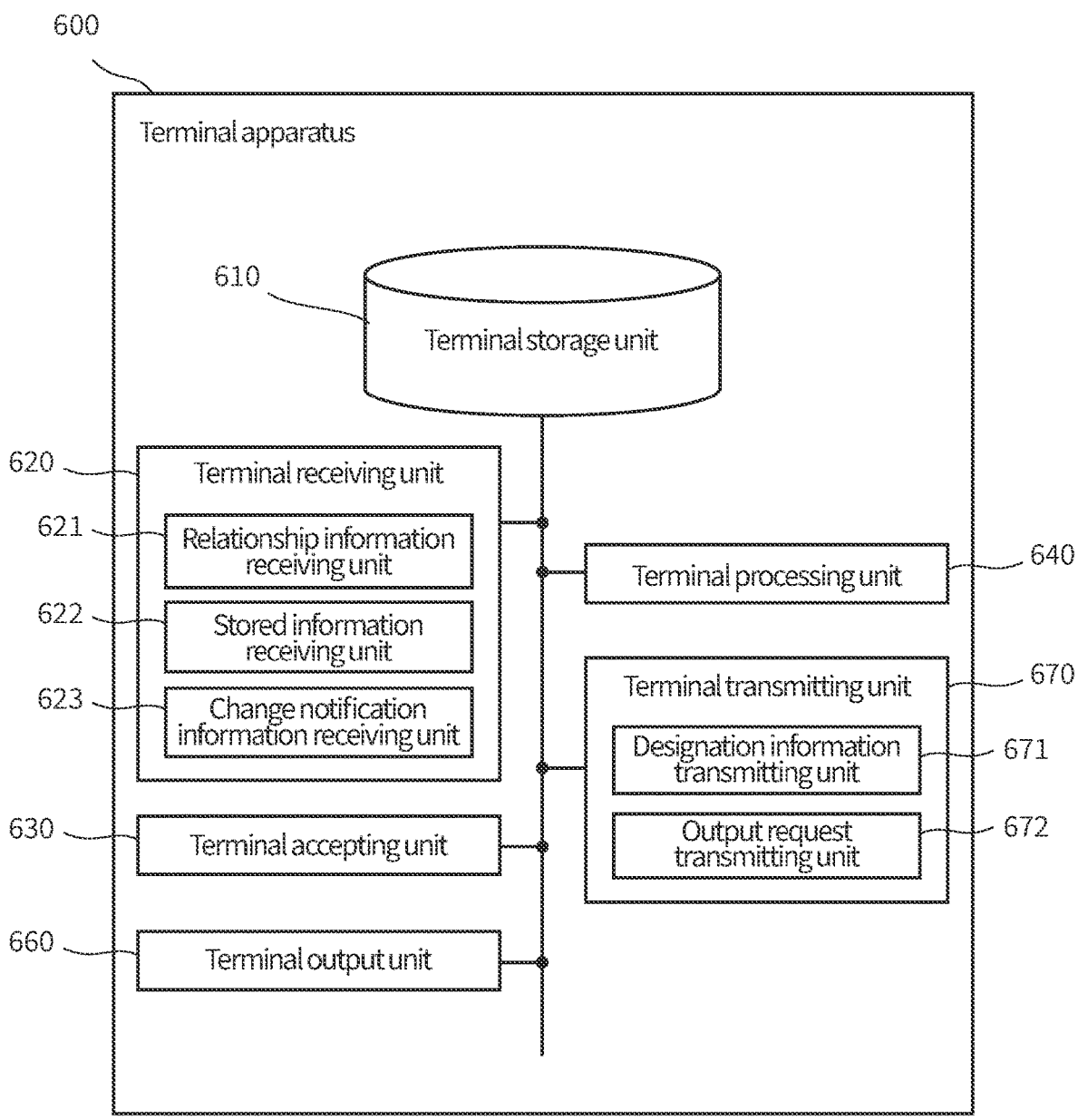
FIG. 4 is a block diagram of a terminal apparatus in the embodiment.

FIG. 2 is a block diagram of the information processing system 900. FIG. 3 is a block diagram of the information processing apparatus 100. FIG. 4 is a block diagram of the terminal apparatus 600.

As shown in FIG. 2, the reading apparatus 700 is, for example, a scanner that reads a document as an image. For example, the reading apparatus 700 reads a business card as a document, and generates a business card image. The reading apparatus 700 can output the generated business card image to the outside. In this embodiment, the reading apparatus 700 transmits the business card image via a network to the second external apparatus 920, but there is no limitation to this.

The first external apparatus 910 includes a first external apparatus storage unit 911, a first external apparatus processing unit 915, a first external apparatus transmitting unit 916, and a first external apparatus receiving unit 917. The first external apparatus 910 is, for example, a server apparatus with a general configuration, but there is no limitation to this, and the first external apparatus 910 may be an electronic computer in other forms, or an apparatus realized by connecting multiple apparatuses to each other.

The first external apparatus 910 can be connected to a network, and is configured to be communicable with other apparatuses connected to the network.

The first external apparatus storage unit 911 is preferably a non-volatile storage medium, but can also be realized by a volatile storage medium. Various types of information, programs, and the like are stored in the first external apparatus storage unit 911. There is no limitation on the procedure in which the information and the like are stored. For example, the information may be stored in the first external apparatus storage unit 911 via a storage medium, the information transmitted via a communication line or the like may be stored in the first external apparatus storage unit 911, or the information input via an input device may be stored in the first external apparatus storage unit 911.

An anti-social check database 912 is stored in the first external apparatus storage unit 911. Anti-social information regarding various anti-social forces are recorded as one or more attribute values in the anti-social check database 912. In this embodiment, the anti-social information is recorded in association with one or more identifiers in the anti-social check database 912. Specifically, for example, anti-social information regarding whether or not one organization is an organization related to an anti-social force is recorded in association with an organization identifier, which is code for identifying the organization, an organization name that is an attribute value, and a country identifier for specifying a country corresponding to the organization. For example, anti-social information regarding whether or not one person is related to an anti-social force is recorded in association with a personal identifier, which is code for identifying the person, a name of the person, or the like. A combination of an organization identifier and a personal identifier may be recorded in association with anti-social information. The configuration of the anti-social check database 912 is not limited to this. For example, anti-social information may be recorded in association with other identifiers corresponding to people or organizations. The anti-social information may be information indicating whether or not one organization or person belongs to an anti-social force, a value indicating a level or possibility of one organization or person being considered as being related to an anti-social force, or the like, or may be information in other various forms.

For example, it is also possible that the anti-social check database 912 does not contain anti-social information as an attribute value, but contains an organization identifier of an organization related to an anti-social force or a personal identifier of a person related to an anti-social force. In that case, the state in which such an organization identifier or personal identifier is contained in the anti-social check database 912 is regarded as indicating that the organization or person corresponding thereto is related to the anti-social force. On the contrary, for example, it is also possible that the anti-social check database 912 does not contain anti-social information as an attribute value, but contains an organization identifier of an organization not related to any anti-social forces or a personal identifier of a person not related to any anti-social forces. In that case, the state in which such an organization identifier or personal identifier is contained in the anti-social check database 912 is regarded as indicating that the organization or person corresponding thereto is not related to any anti-social forces. In these cases, it can be assured that anti-social information regarding a relationship between the organization or the person corresponding to the organization identifier or the personal identifier and anti-social forces is obtained based on a search result as to whether or not the organization identifier or the personal identifier is contained in the anti-social check database 912.

The first external apparatus processing unit 915 may be realized typically by an MPU, a memory, or the like. Typically, the processing procedure of the first external apparatus processing unit 915 is realized by software, and the software is stored in a storage medium such as a ROM. Note that the processing procedure may be realized also by hardware (dedicated circuits). For example, the first external apparatus processing unit 915 acquires information or the like, in the first external apparatus 910. For example, it searches the anti-social check database 912 stored in the first external apparatus storage unit 911, based on an acquired query or the like (e.g., an SQL statement).

The first external apparatus transmitting unit 916 transmits information read by the first external apparatus processing unit 915 from the first external apparatus storage unit 911 or the like. For example, the first external apparatus transmitting unit 916 transmits, via a network, information obtained by searching the anti-social check database 912 based on an operation of the first external apparatus processing unit 915, to the information processing apparatus 100 and the like.

The first external apparatus receiving unit 917 receives, via a network, information transmitted from the information processing apparatus 100 or other apparatuses. The first external apparatus receiving unit 917 accumulates the received information, for example, in the first external apparatus storage unit 911, thereby allowing the first external apparatus processing unit 915 and the like to acquire the information.

The second external apparatus 920 is also a server apparatus with a configuration similar to that of the first external apparatus 910. That is to say, the second external apparatus 920 includes a second external apparatus storage unit 921 with a hardware configuration similar to that of the first external apparatus storage unit 911. The second external apparatus 920 includes a second external apparatus processing unit 925, a second external apparatus transmitting unit 926, and a second external apparatus receiving unit 927. The second external apparatus processing unit 925, the second external apparatus transmitting unit 926, and the second external apparatus receiving unit 927 have configurations similar to those of the first external apparatus processing unit 915, the first external apparatus transmitting unit 916, and the first external apparatus receiving unit 917, respectively.

In this embodiment, the second external apparatus receiving unit 927 receives a business card image transmitted from the reading apparatus 700. The second external apparatus transmitting unit 926 transmits business card information acquired by a business card information acquiring unit 925*b*, as will be described below, to the information processing apparatus 100. The second external apparatus transmitting unit 926 may transmit, in association with business card information that is to be transmitted, a user identifier and the like for identifying a user related to a business card from which the business card information is acquired. The user related to a business card may be, for example, a user who received the business card from the other party by exchanging business cards, or a user who caused the reading apparatus 700 to read the business card.

The second external apparatus processing unit 925 includes a business card information acquiring unit 925*b*. The business card information acquiring unit 925*b* acquires business card information corresponding to the received business card image. The business card information acquiring unit 925b may acquire business card information through a known method. For example, text contained in a business card image may be recognized by applying an optical character recognition technique to the image, and acquired as business card information. The business card information may be acquired through a machine learning technique. It is also possible that information input by an operator who saw a business card image is acquired as the business card information.

The business card image is not limited to those transmitted by the reading apparatus 700. For example, it is also possible that a business card image generated by reading a business card with a camera, a reading apparatus, or the like provided in the terminal apparatuses 600 or connected to the terminal apparatuses 600 is transmitted from the terminal apparatuses 600, a business card image stored in a storage unit of an external device or the like is acquired, or an image displayed on a display screen of the second external apparatus 920 is acquired as the business card image.

Furthermore, the reading apparatus 700 may have the above-described business card information acquiring function of the second external apparatus receiving unit 927. In that case, the reading apparatus 700 may transmit the acquired business card information to the information processing apparatus 100.

The functions of the first external apparatus 910 and the second external apparatus 920 in the information processing system 900 may be realized by a single apparatus, or the function of either the first external apparatus 910 or the second external apparatus 920 may be realized by the information processing apparatus 100.

As shown in FIG. 3, the information processing apparatus 100 includes a storage unit 110, a receiving unit 120, an accepting unit 130, a processing unit 140, and an output unit 160. The information processing apparatus 100 is, for example, a server apparatus.

The information processing apparatus 100 is configured to be capable of specifying privileges of users who use the terminal apparatuses 600 (whether the users are administrative users or general users other than the administrative users) through various methods. For example, it is also possible that information that is transmitted from users who use the terminal apparatuses 600 to the information processing apparatus 100 contains identifiers with which the users can be specified, and the information processing apparatus 100 can specify privileges of the uses based on the identifiers.

The storage unit 110 includes an organization database 111, a personal database 112, and a business card information storage unit 113.

The storage unit 110 is preferably a non-volatile storage medium, but can also be realized by a volatile storage medium. For example, information acquired by the receiving unit 120 and the processing unit 140, and the like are stored in the constituent units of the storage unit 110, but there is no limitation on the procedure in which the information and the like are stored in the constituent units of the storage unit 110. For example, the information and the like may be stored in the storage unit 110 via a storage medium, the information and the like transmitted via a communication line or the like may be stored in the storage unit 110, or the information and the like input via an input device may be stored in the storage unit 110.

The organization database 111 is, for example, a database in which an organization name, an organization address, a country identifier for specifying a country in which an organization is located (e.g., a country in which a headquarters office, a main store, or the like of an organization is located), contact information (a URL of a website, a telephone number, a fax number, etc.), or the like is recorded in association with an organization identifier for specifying the organization.

The organization identifier is, for example, a combination of unique pieces of code allocated to an organization. The information contained in the organization database 111 is not limited to those mentioned above, and may include information different from those mentioned above or may not include part of the information mentioned above. It is preferable that the organization identifier is set such that the same organization is allows to be spelled in several different ways, for example, in consideration of spelling inconsistencies. Specifically, it is preferable that names of an organization spelled in multiple different ways are identified in advance, and the same organization identifier is associated therewith.

An organization is, for example, a company, an educational institution such as a school, a public office, a local government, a union, or the like. The organization may be a company group or the like to which multiple companies belong. The organization may be a public organization or a private organization. The organization may be a profit organization or a non-profit organization.

The country identifier is code or the like uniquely indicating a country. The country identifier is, for example, an ID, but there is no limitation on the type thereof, as long as it is information with which the corresponding item can be identified. That is to say, the country identifier may be a name of a country indicated thereby, or pieces of code combined so as to uniquely correspond to a certain item. A combination of two or more pieces of information (e.g., attribute values of a record stored in a database, etc.) may be used as the country identifier.

The personal database 112 is, for example, a database in which a personal name is recorded in association with a personal identifier for specifying the person. It is sufficient that the personal identifier is information with which a person can be identified, and examples thereof include unique pieces of code allocated to a person, or may be an e-mail address, a portable telephone number, an SMS address, or the like of a person. An organization to which a person belongs may be recorded in the personal database 112. The organization to which a person belongs is an organization in which a person is.

Business card information accepted by a business card information accepting unit 131 as will be described later is stored in the business card information storage unit 113.

The receiving unit 120 receives information transmitted from another apparatus. The receiving unit 120 stores the received information, for example, in the storage unit 110.

The accepting unit 130 includes a business card information accepting unit 131, a designation information accepting unit 132, and an output request accepting unit 133.

The accepting unit 130 accepts the information received by the receiving unit 120. The accepting unit 130 may accept information input using an input part connected to the information processing apparatus 100, or information input through an input operation (e.g., also including information read by an apparatus) using a reading apparatus (e.g., a code reader, etc.) connected to the information processing apparatus 100. The accepted information is accumulated, for example, in the storage unit 110. There is no limitation on the input part, and examples thereof include a numeric keypad, a keyboard, a mouse, and a menu screen.

The business card information accepting unit 131 accepts business card information regarding a business card. In this embodiment, the business card information accepting unit 131 accepts business card information transmitted from the second external apparatus receiving unit 927 and received by the receiving unit 120.

The designation information accepting unit 132 accepts designation information input by a user. The designation information is information input by a user and indicating a relationship between a business card and an anti-social force. In this embodiment, as will be described later, in the case in which relationship information is output by a relationship information output unit 161 to a user, the designation information is input from the user using the terminal apparatus 600. If the designation information input to the terminal apparatus 600 is transmitted to the information processing apparatus 100 and received by the receiving unit 120, the designation information accepting unit 132 accepts the designation information. The designation information accepting unit 132 accumulates the accepted designation information in the storage unit 110 in association with an identifier regarding the business card information corresponding to relationship information output by a relationship information output unit 161. The identifier regarding the business card information may be, for example, a personal identifier or an organization identifier, or may be other identifiers such as a business card identifier for identifying a business card.

In this embodiment, the business card identifier for identifying a business card and other identifiers other than personal identifiers or organization identifiers are code or the like uniquely indicating an item. These identifiers are, for example, an ID, but there is no limitation on the type thereof, as long as it is information with which the corresponding item can be identified. The identifiers may be a name indicating an item itself, or pieces of code combined so as to uniquely correspond to a certain item. A combination of two or more pieces of information (e.g., attribute values of a record stored in a database, etc.) may be used as the identifier.

In this embodiment, the relationship information may be output to an administrative user. Specifically, for example, a relationship information output unit 161 outputs the relationship information such that it can be seen by a predetermined administrative user, on the terminal apparatus 600 that is being operated by the administrative user. Accordingly, the designation information can be considered as being information that is input by an administrative user.

The output request accepting unit 133 accepts input of output request information from the user. The output request information is information for requesting output of the business card information accepted by the business card information accepting unit 131, other business card information, or the like. The output request information is input, for example, from the user using the terminal apparatus 600. If the output request information input to the terminal apparatus 600 is transmitted to the information processing apparatus 100 and received by the receiving unit 120, the output request accepting unit 133 accepts the output request information. The output request information is transmitted in association with an identifier regarding the business card information designated by the user. That is to say, the output request accepting unit 133 associates the accepted output request information with an identifier regarding the business card information designated by the user. The identifier regarding the business card information may be, for example, a personal identifier or an organization identifier, or may be other identifiers such as a business card identifier for identifying a business card.

The designation information and the output request information being input means that these pieces of information are indirectly input to the information processing apparatus 100 from the user via the terminal apparatus 600 or the like, but may be interpreted as meaning that these pieces of information are directly input to the information processing apparatus 100 from the user using an input part. The designation information and the output request information do not absolutely have to be information generated by a direct operation (an input operation, etc.) by the user. That is to say, the inputting these pieces of information may encompass performing various operations due to which these pieces of information will be given to the information processing apparatus 100, for example, executing a program for automatically generating these pieces of information, causing a program to function by giving various types of information to the program, and the like.

The processing unit 140 includes an anti-social information acquiring unit 141, a relationship information acquiring unit 142, a relationship information accumulating unit 143, a designation information accumulating unit 144, a stored information acquiring unit 145, and an information check unit 146. The processing unit 140 performs various types of processing. The various types of processing are, for example, processing that is performed by the constituent units of the processing unit 140 as follows.

The anti-social information acquiring unit 141 includes a business card information processing unit 151, a first search unit 152, a second search unit 153, and an anti-social information re-acquiring unit 154. As will be described below, the anti-social information acquiring unit 141 causes the business card information processing unit 151, the first search unit 152, and the second search unit 153 to search for information regarding an anti-social force contained in the anti-social check database 912, using an identifier regarding the business card information accepted by the business card information accepting unit 131, thereby acquiring anti-social information based on a search result. In this embodiment, in the case in which anti-social information regarding an anti-social force contained in the anti-social check database 912 is obtained as a search result, the anti-social information is acquired, but there is no limitation to this. For example, a search result of information regarding an anti-social force contained in the anti-social check database 912 is information indicating the number of pieces of information retrieved, information indicating whether or not there is any information retrieved, or the like, the information indicating the number or the information indicating whether or not there is any such information may be acquired as the anti-social information. In this embodiment, for example, at least one of an organization identifier and a personal identifier is used to acquire anti-social information, but there is no limitation to this, and other identifiers regarding business card information may be used.

The business card information processing unit 151 acquires an identifier regarding the business card information accepted by the business card information accepting unit 131. In this embodiment, the business card information processing unit 151 acquires an organization identifier for identifying an organization to which a person indicated on the business card belongs. The organization identifier may be acquired, for example, by searching the organization database 111 for an organization identifier corresponding to an organization name or other types of information contained in the business card information, for example, but there is no limitation to this. For example, code obtained as a result of performing predetermined processing (e.g., performing hash processing, etc.) on information regarding an organization contained in the business card information may be acquired as the organization identifier. In this embodiment, for example, the business card information processing unit 151 acquires a country identifier corresponding to an organization name or other types of information contained in the business card information, from the organization database 111. The business card information processing unit may accumulate the acquired organization identifier and other identifiers in the business card information storage unit 113 in association with the business card information.

Regardless of the definition above, it is also possible that a business card image is business card information. In that case, the business card information processing unit 151 may, for example, perform processing through an optical character recognition technique on the business card image accepted by the business card information accepting unit 131, thereby acquiring information contained in the business card, for example, information on a person, information on an organization to which a person belongs, information on an organization, and the like, or acquiring an organization identifier, other identifiers, and the like based on the acquired information. In this case, the information processing system 900 does not need the second external apparatus 920.

The first search unit 152 generates a query containing the identifier acquired by the business card information processing unit 151. In this embodiment, the first search unit 152 generates a first query containing the organization identifier acquired by the business card information processing unit 151. The first query is, for example, an SQL statement that selects an attribute value corresponding to anti-social information, using an organization identifier as a key, but there is no limitation to this. The first search unit 152 accesses the anti-social check database 912, using the generated first query. Then, the first search unit 152 acquires anti-social information corresponding to the organization identifier contained in the anti-social check database 912. The accessing is, for example, causing, using an SQL query or the like, a management program of each database to operate the database through an operation (accessing method) that browses (an example of "acquires"), updates, adds, or deletes information contained in records, but there is no limitation to this. The first search unit 152 may be configured to access anti-social information corresponding to an organization identifier stored in the corresponding anti-social check database 912 using an API, or so as to access anti-social information corresponding to an organization identifier using a function or the like.

In this embodiment, in the case in which the first search unit 152 fails to acquire anti-social information corresponding to the organization identifier through an inquiry to the anti-social check database 912 using the first query, the anti-social information acquiring unit 141 attempts to cause the second search unit 153 to acquire anti-social information. That is to say, in this case, the second search unit 153 generates a second query containing an organization name acquired from the business card information and a country identifier corresponding thereto. The second query is, for example, an SQL statement that selects an attribute value corresponding to anti-social information, using an organization name and a country identifier as a key, but there is no limitation to this. Then, the second search unit 153 accesses the anti-social check database 912, using the generated second query, and acquires anti-social information corresponding to the organization name acquired from the business card information and the country identifier. The second query may be generated in the case in which the first search unit 152 fails to acquire anti-social information, or may be generated before the first search unit 152 accesses the anti-social check database 912.

Furthermore, when a predetermined check time has arrived, the anti-social information acquiring unit 141 acquires anti-social information at that point in time through an operation by the anti-social information re-acquiring unit 154. The predetermined check time is, for example, regular times (e.g., a time that arrives every time a predetermined number of days, a predetermined number of weeks, or a predetermined number of years has elapsed), but there is no limitation to this. The predetermined check time may be a date and time or the like set in advance. When a predetermined check time has arrived, the anti-social information re-acquiring unit 154 causes the business card information processing unit 151, the first search unit 152, and the second search unit 153 to acquire anti-social information as described above. That is to say, when a predetermined check time has arrived, the anti-social information re-acquiring unit 154 acquires the anti-social information contained in the anti-social check database 912, using the identifier regarding the business card information acquired by the business card information processing unit 151. It is also possible that an administrative user or the like can set various conditions for the predetermined check time. That is to say, it is possible to make the settings such that a check time regularly arrives (e.g., when a predetermined number of days, a predetermined number of weeks, or a predetermined number of years has elapsed), such that a check time arrives when a predetermined in-use state is obtained, or such that a check time arrives when predetermined information is accepted by the accepting unit 130. The state in which a predetermined in-use state is obtained may be, for example, a state in which relationship information is output a predetermined number of instances, or in which a predetermined command is transmitted from a user.

In this embodiment, the business card information processing unit 151 may acquire business card information accepted by the business card information accepting unit 131, and acquire a personal identifier for identifying a person indicated on the business card from the business card information. In the case in which the business card information processing unit 151 acquires a personal identifier in this manner, the first search unit 152 may generate a query containing the personal identifier acquired by the business card information processing unit 151, and acquire anti-social information corresponding to the personal identifier contained in the anti-social check database 912, using the generated query.

The personal identifier may be acquired, for example, by searching the personal database 112 for a personal identifier corresponding to a full name of a person or other types of information contained in the business card information, but there is no limitation to this. For example, code obtained as a result of performing predetermined processing on information regarding a person contained in the business card information may be acquired as the personal identifier. The business card information processing unit 151 may accumulate the acquired personal identifier in the business card information storage unit 113 in association with the business card information. The business card information processing unit 151 may acquire both of an organization identifier and a personal identifier, or may acquire a personal identifier without acquiring an organization identifier. If the business card information processing unit 151 acquires both of an organization identifier and a personal identifier in this manner, the first search unit 152 may generate a query containing both of the organization identifier and the personal identifier acquired by the business card information processing unit 151, and acquire anti-social information corresponding to both of the organization identifier and the personal identifier contained in the anti-social check database 912, using the generated query.

The organization identifier or the personal identifier may be acquired, by the second external apparatus 920 or other devices. In that case, the organization database 111, the personal database 112, and the like may be stored in the second external apparatus storage unit 921 and the like.

The relationship information acquiring unit 142 acquires relationship information indicating a relationship between a business card and an anti-social force, based on the anti-social information acquired by the anti-social information acquiring unit 141. For example, in the case in which the anti-social information indicates belonging to an anti-social force, the relationship information acquiring unit 142 acquires relationship information indicating that there is a relationship between the business card information regarding the identifier contained in the query that was used to acquire the anti-social information and the anti-social force. For example, in the case in which the anti-social information does not indicate belonging to an anti-social force, the relationship information acquiring unit 142 acquires relationship information indicating that there is no relationship between the business card information regarding the identifier contained in the query that was used to acquire the anti-social information and the anti-social force. The anti-social information may or may not be the same information as the relationship information.

For example, in the case in which the anti-social information indicates a possibly of belonging to an anti-social force, the relationship information acquiring unit 142 may acquire relationship information indicating that there is a relationship between the business card information regarding the identifier contained in the query that was used to acquire the anti-social information and the anti-social force, if the anti-social information satisfies a predetermined condition (e.g., a condition that the possibility of belonging to an anti-social force is indicated as a proportion). Specifically, for example, assuming that the predetermined condition is that the possibility of belonging to an anti-social force is 60% or more, if the anti-social information indicates that the possibility of belonging to an anti-social force is 65%, the relationship information acquiring unit 142 may acquire relationship information indicating that there is a relationship between the business card information and the anti-social force.

Also in the case in which anti-social information is acquired through an operation by the anti-social information re-acquiring unit 154, the relationship information acquiring unit 142 may acquire relationship information based on the anti-social information.

The anti-social check database 912 may not have anti-social information corresponding to an identifier regarding the business card information. In this embodiment, in the case in which there is no anti-social information corresponding to an identifier regarding the business card information, the relationship information acquiring unit 142 acquires relationship information indicating that there is no relationship between the business card information and anti-social forces, but there is no limitation to this. That is to say, information indicating that there is no information regarding a relationship or the like may be acquired as the relationship information. Specifically, for example, it is also possible that three types of relationship information indicating belonging to an anti-social force, not belonging to an anti-social force, or not being clear are acquired.

The relationship information accumulating unit 143 accumulates the relationship information acquired by the relationship information acquiring unit 142, in the business card information storage unit 113, in association with the identifier contained in the query that was used to acquire the anti-social information, or business card information regarding the identifier. The constituent unit in which the relationship information is to be accumulated is not limited to the business card information storage unit 113, and may be other constituent units in the storage unit 110.

If the designation information accepting unit 132 accepts designation information, the designation information accumulating unit 144 accumulates, based on an identifier associated with the designation information, the designation information and business card information or the like corresponding to the identifier in association with each other in the business card information storage unit 113. The constituent unit in which these pieces information are to be accumulated is not limited to the business card information storage unit 113, and may be other constituent units in the storage unit 110.

If the output request accepting unit 133 accepts output request information, the stored information acquiring unit 145 acquires, based on the identifier associated with the output request information, designation information and business card information or the like corresponding to the identifier, from the business card information storage unit 113. If the designation information is stored in other constituent units in the storage unit 110, the stored information acquiring unit 145 may acquire designation information and business card information or the like from the storage unit 110.

In this embodiment, the stored information acquiring unit 145 can acquire a piece of the designation information, and the identifier regarding the business card information corresponding to the designation information, from the storage unit 110. For example, the stored information acquiring unit 145 acquires multiple combinations of a piece of the designation information, and the identifier regarding the business card information corresponding to the designation information, for example, from the business card information storage unit 113, every time a predetermined check time arrives at which the anti-social information re-acquiring unit 154 acquires anti-social information. When a predetermined check time has arrived, anti-social information corresponding to an identifier regarding the business card information corresponding to the designation information acquired by the stored information acquiring unit 145 may be acquired by the anti-social information re-acquiring unit 154, or designation information corresponding to the identifier contained in the query that was used by the anti-social information re-acquiring unit 154 to acquire the anti-social information may be acquired by the stored information acquiring unit 145.

When a predetermined check time has arrived and the anti-social information re-acquiring unit 154 acquires anti-social information, the information check unit 146 compares a relationship indicated by relationship information that can be output by a relationship information output unit 161 based on the acquired anti-social information (i.e., the relationship information that is acquired by the relationship information acquiring unit 142), and a relationship indicated by the existing designation information acquired by the stored information acquiring unit 145 from the storage unit 110. In other words, the information check unit 146 compares a relationship corresponding to newly acquired anti-social information and a relationship indicated by existing designation information.

The output unit 160 includes a relationship information output unit 161, a stored information output unit 162, and a change notification information output unit 163. In this embodiment, the output unit 160 outputs information by transmitting the information to another apparatus using a transmitting unit 170 or the like, but there is no limitation to this, and, for example, it is also possible to output information by displaying the information on a display device provided on the information processing apparatus 100.

The relationship information output unit 161 outputs the relationship information acquired by the relationship information acquiring unit 142. That is to say, the relationship information output unit 161 outputs the relationship information based on the anti-social information acquired by the anti-social information acquiring unit 141. The relationship information output unit 161 is configured to output relationship information to a predetermined administrative user, but there is no limitation to this. For example, the relationship information output unit 161 can output the relationship information by outputting information for displaying a designation screen on which business card information or the like and relationship information are displayed and input of designation information from a user is accepted, but the form in which the relationship information is output is not limited to this. The information for displaying a designation screen is, for example, information stored in advance in the storage unit 110 and used to display an accepting screen as a web page (e.g., a document in an HTML format, information for use in a web page generating system (content management system, etc.) that functions on the information processing apparatus 100 or the terminal apparatuses 600, etc.), but there is no limitation to this.

In this embodiment, in the case in which relationship information indicating that there is a relationship between business card information and an anti-social force is acquired, the relationship information output unit 161 may perform output through notification using a notifying part to a predetermined administrative user. The notifying part may be various parts such as transmission of an email or the like, transmission of so-called push notifications, transmission of a telephone call, or the like. Accordingly, the administrative user can reliably see the existence of business card information with a certain level of risk.

Furthermore, the relationship information output unit 161 may be configured such that it can output a list screen on which an administrative user can see, in the form of a list, the business card information for which relationship information was acquired up to that point in time. The relationship information output unit 161 may be configured to output information for displaying a designation screen on which input of designation information is accepted, when an administrative user performs an operation that selects one piece of business card information on the list screen. It is also possible that the list screen contains only business card information for which relationship information indicating that there is a relationship with an anti-social force is acquired, and, in that case, the administrative user can see, in the form of a list, business card information with a certain level of risk. Also, it is possible to efficiently input designation information for each piece of business card information with a certain level of risk.

In the case in which the stored information acquiring unit 145 acquires designation information and business card information or the like corresponding thereto in response to accepting output request information, the stored information output unit 162 outputs the acquired information. In this embodiment, the stored information output unit 162 outputs the business card information or the like, in a form that conforms to the designation information acquired by the stored information acquiring unit 145. The output in a form that conforms to the designation information may be, for example, various types of output such as displaying the content of the designation information and the business card information in an image indicating predetermined marks or code according to the content of the designation information, displaying a code string that can be displayed as text, in addition to the business card information, displaying the business card information whose text, background, or the like has a color according to the content of the designation information, or the like.

In the case in which the information check unit 146 determines that the relationship indicated by the relationship information acquired by the relationship information acquiring unit 142 is different from the relationship indicated by the existing designation information, the change notification information output unit 163 outputs change notification information indicating that effect. That is to say, the change notification information is information indicating that the relationship corresponding to newly acquired anti-social information is different from the relationship indicated by the existing designation information. The change notification information is, for example, information that is output as an image, a voice, or the like that can be seen by a user on the terminal apparatus 600, but there is no limitation to this.

A transmitting unit 170 transmits information via a network to another apparatus constituting the information processing system 900. For example, the transmitting unit 170 transmits the information output by the output unit 160. In this embodiment, the information output by the relationship information output unit 161 or the change notification information output unit 163 is transmitted, for example, to the terminal apparatus 600 that is used by an administrative user, based on a user identifier or the like for specifying the administrative user. The information output by the stored information output unit 162 is transmitted to the terminal apparatus 600 of a user who input the output request information, based on a user identifier or the like of the user.

Next, the configuration of each terminal apparatus 600 will be described.

As shown in FIG. 4, the terminal apparatus 600 includes a terminal storage unit 610, a terminal receiving unit 620, a terminal accepting unit 630, a terminal processing unit 640, a terminal output unit 660, and a terminal transmitting unit 670.

The terminal apparatus 600 is, for example, a general-purpose personal computer, and includes a display screen that is an output apparatus, an input apparatus (e.g., a keyboard, a pointing device, etc.) for use in an input operation by a user, and the like, but there is no limitation to this. The terminal apparatus 600 can be connected to a network, and is configured to be communicable with other apparatuses connected to the network.

The terminal storage unit 610 is preferably a non-volatile storage medium, but can also be realized by a volatile storage medium. Various types of information, programs, and the like are stored in the terminal storage unit 610. There is no limitation on the procedure in which the information and the like are stored. For example, the information may be stored in the terminal storage unit 610 via a storage medium, the information transmitted via a communication line or the like may be stored in the terminal storage unit 610, or the information input via an input device may be stored in the terminal storage unit 610.

The terminal receiving unit 620 includes a relationship information receiving unit 621, a stored information receiving unit 622, and a change notification information receiving unit 623. The terminal receiving unit 620 receives, via a network, information transmitted from the information processing apparatus 100 or other apparatuses. For example, the terminal receiving unit 620 accumulates the received information in the terminal storage unit 610 such that the terminal processing unit 640 and the like can acquire the information.

The relationship information receiving unit 621 receives the relationship information transmitted from the information processing apparatus 100, and accumulates the information in the terminal storage unit 610. Accordingly, for example, a designation screen for accepting accept input of designation information from a user is displayed on the display device of the terminal apparatus 600 or the like.

The stored information receiving unit 622 receives the business card information or the like transmitted from the information processing apparatus 100 in response to output request information. Accordingly, in this embodiment, the business card information or the like is output to the terminal apparatus 600 in a form that conforms to the designation information.

In the case in which change notification information is transmitted from the information processing apparatus 100, the change notification information receiving unit 623 receives the information. Accordingly, for example, the change notification information is displayed on the display device of the terminal apparatus 600 or the like, and can be seen by a user who uses the terminal apparatus 600.

The terminal accepting unit 630 accepts various input operations to the terminal apparatus 600 by a user who uses the terminal apparatus 600. The operations are performed, for example, using an unshown input apparatus, but there is no limitation to this. It is also possible that, for example, the terminal accepting unit 630 accepts an input operation performed using a voice input from a microphone, or accepts an input operation performed using a reading apparatus (e.g., a code reader, etc.) connected to the terminal apparatus 600.

The terminal processing unit 640 performs various information processing operations, using the constituent units of the terminal apparatus 600.

The terminal output unit 660 outputs information, for example, by displaying the information on the display device. The method for outputting information is not limited to this, and the output may be performed by outputting a voice or the like from a speaker or the like.

The terminal transmitting unit 670 includes a designation information transmitting unit 671 and an output request transmitting unit 672. For example, the terminal transmitting unit 670 transmits the information acquired by the terminal processing unit 640 or the like, via a network.

In the case in which an input operation of designation information from a user is accepted by the terminal accepting unit 630, the designation information transmitting unit 671 transmits the designation information to the information processing apparatus 100.

In the case in which an input operation of output request information from a user is accepted by the terminal accepting unit 630, the output request transmitting unit 672 transmits the output request information to the information processing apparatus 100. The output request information is input by designating one of the one or more pieces of business card information. That is to say, the output request transmitting unit 672 transmits output request information, in association with an identifier regarding the business card information designated by the user.

The processing unit 140 and the terminal processing unit 640 described above may be realized typically by MPUs, memories, or the like. Typically, the processing procedure of the processing unit 140 and the terminal processing unit 640 is realized by software, and the software is stored in a storage medium such as a ROM. Note that the processing procedure may be realized also by hardware (dedicated circuits).

Furthermore, there is no limitation on the input part that is used to input the information that can be accepted by the accepting unit 130 or the terminal accepting unit 630, and examples thereof include a numeric keypad, a keyboard, a mouse, and a menu screen. The accepting unit 130 and the terminal accepting unit 630 may be realized by a device driver of an input unit such as a numeric keypad or a keyboard, or by control software for a menu screen, for example.

Furthermore, the external apparatus receiving unit 917, the second external apparatus receiving unit 927, the receiving unit 120, and the terminal receiving unit 620 are typically realized by wireless or wired communication parts, but also may be realized by broadcast receiving part.

Furthermore, the external apparatus transmitting unit 916, the second external apparatus transmitting unit 926, the transmitting unit 170, and the terminal transmitting unit 670 are typically realized by wireless or wired communication parts, but also may be realized by broadcasting parts.

Furthermore, the output unit 160 and the terminal output unit 660 may or may not include an output device such as a display screen or a speaker. The output unit 160 and the terminal output unit 660 are realized by driver software for an output device, or a combination of driver software for an output device and the output device, for example.

The information processing apparatus 100, the first external apparatus 910, and the second external apparatus 920 may be each constituted by one server, may be constituted by multiple servers that operate in cooperation with each other, or may be electronic computers or the like included in other devices. The servers may be so-called cloud servers, ASP servers, or the like, and it will be appreciated that there is no limitation on the type thereof.

Figure 5:
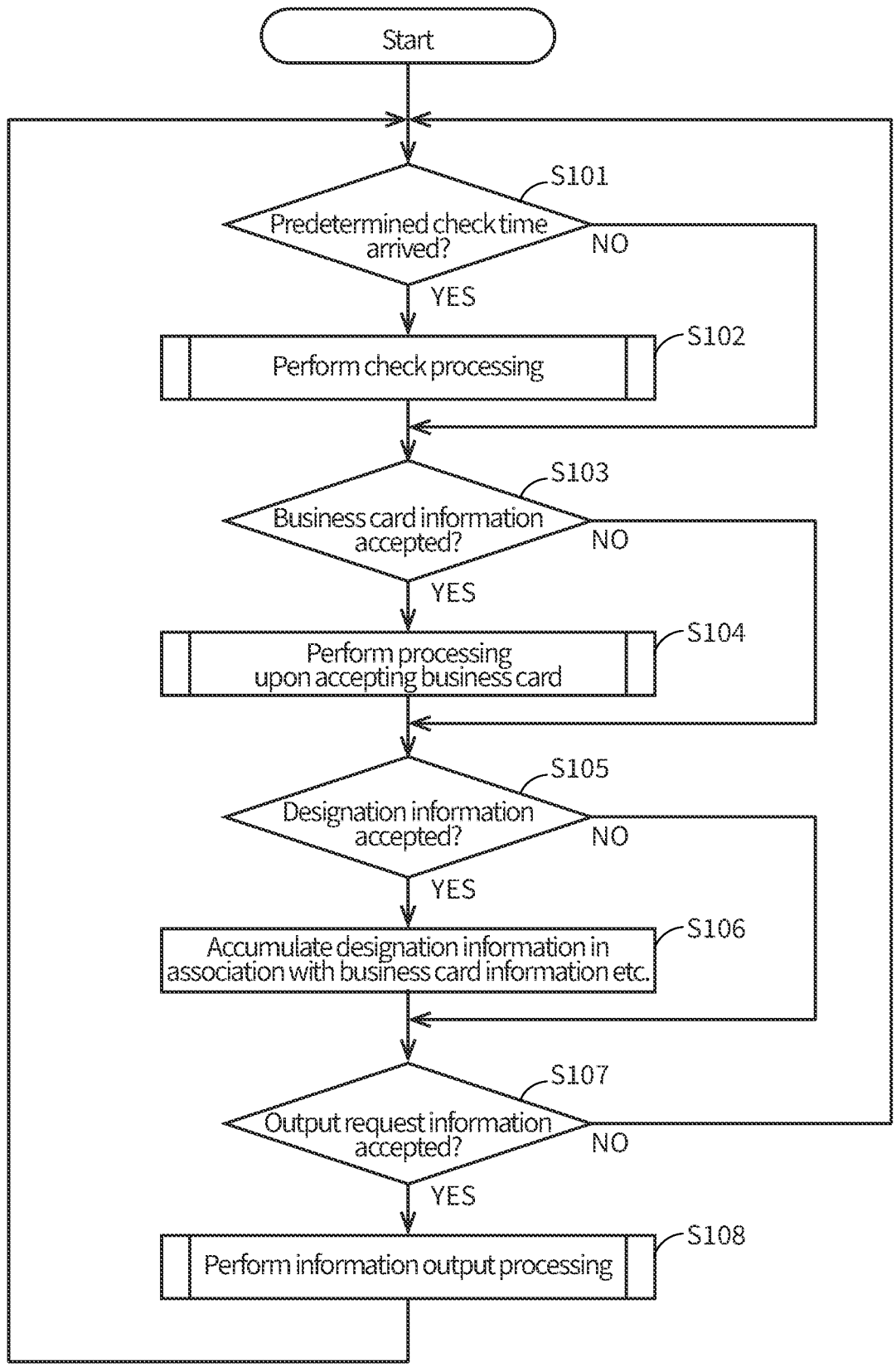
FIG. 5 is a flowchart showing an example of an operation of the information processing apparatus in the embodiment.

FIG. 5 is a flowchart showing an example of the information processing apparatus 100.

The information processing apparatus 100 performs various operations, for example, as will be described below. It is sufficient that these operations are ended, for example, when the information processing apparatus 100 is turned off.

(Step S101) The processing unit 140 determines whether or not a predetermined check time has arrived. If a check time has arrived, the procedure advances to step S102, and, if otherwise, the procedure advances to step S103.

(Step S102) The processing unit 140 performs check processing. The check processing will be described later in detail. The procedure advances to step S103.

(Step S103) The processing unit 140 determines whether or not the business card information accepting unit 131 has accepted business card information. If the business card information accepting unit 131 has accepted business card information, the procedure advances to step S104, and, if otherwise, the procedure advances to step S105.

(Step S104) The processing unit 140 performs processing upon accepting a business card. The processing upon accepting a business card will be described later in detail. The procedure advances to step S105.

(Step S105) The processing unit 140 determines whether or not the designation information accepting unit 132 has accepted designation information. If the designation information accepting unit 132 has accepted designation information, the procedure advances to step S106, and, if otherwise, the procedure advances to step S107.

(Step S106) The designation information accepting unit 132 accumulates the accepted designation information in the storage unit 110 in association with an identifier regarding the business card information corresponding to relationship information output by the relationship information output unit 161. That is to say, the designation information is stored in the storage unit 110 in association with the business card information. The procedure advances to step S107.

(Step S107) The processing unit 140 determines whether or not the output request accepting unit 133 has accepted output request information. If the output request accepting unit 133 has accepted output request information, the procedure advances to step S108, and, if otherwise, the procedure returns to step S101.

(Step S108) The processing unit 140 performs information output processing. The information output processing will be described later in detail. The procedure returns to step S101.

Figure 6:
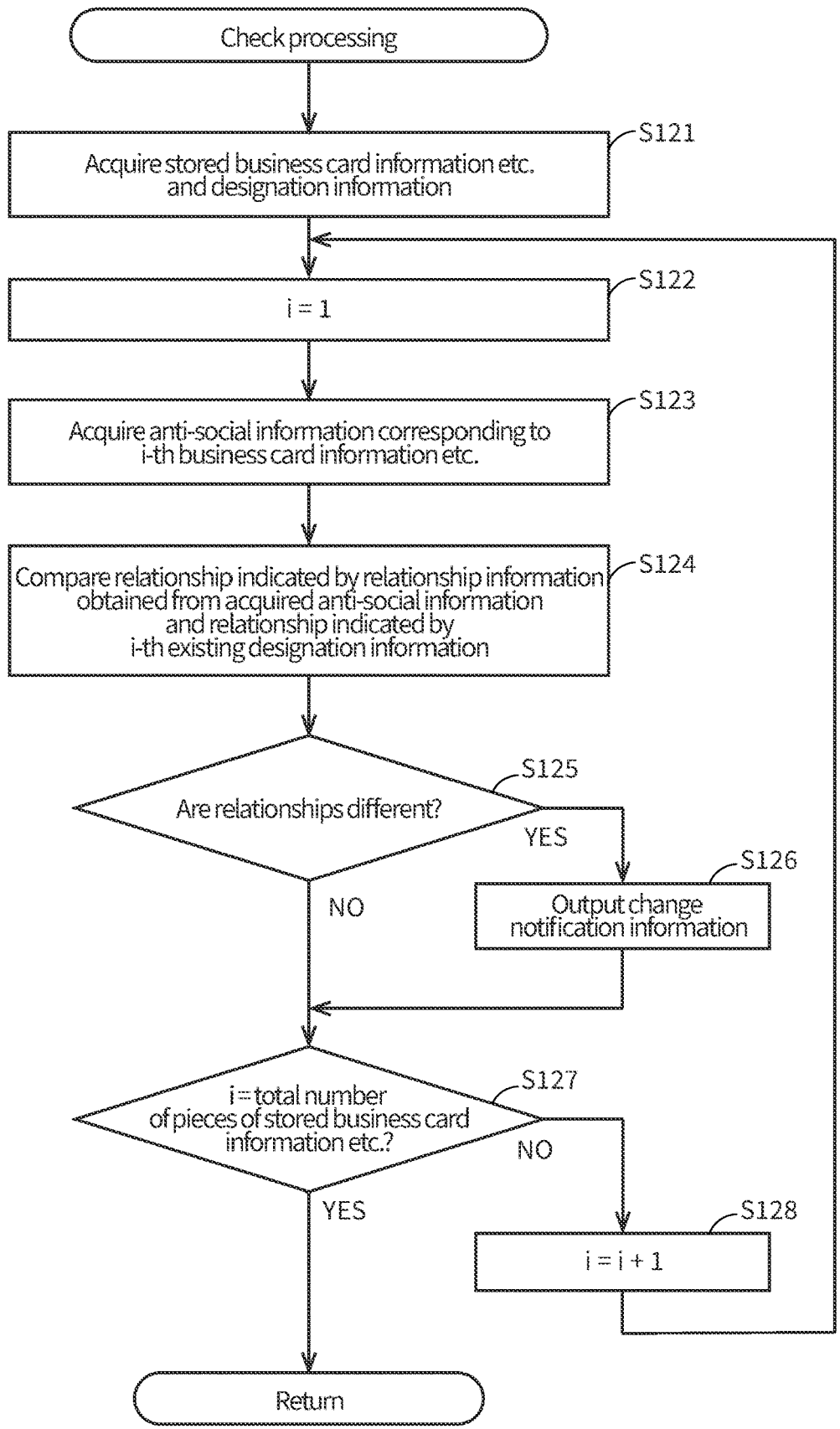
FIG. 6 is a flowchart showing an example of check processing that is performed by the information processing apparatus in the embodiment.

FIG. 6 is a flowchart showing an example of check processing that is performed by the information processing apparatus 100.

(Step S121) The stored information acquiring unit 145 acquires one or more combinations of designation information and business card information or the like stored in the storage unit 110. It is possible to acquire all combinations that are stored, or only some of the combinations. It is sufficient that the business card information or the like contains an identifier regarding the business card information corresponding to the designation information.

(Step S122) The processing unit 140 sets a counter i to 1.

(Step S123) The anti-social information re-acquiring unit 154 acquires anti-social information (it may be referred to as new anti-social information) corresponding to an i-$^{th}$ piece of business card information or the like, from the anti-social check database 912.

(Step S124) The information check unit 146 compares a relationship indicated by relationship information that can be output by the relationship information output unit 161 based on the acquired anti-social information, and a relationship indicated by an i-$^{th}$ piece of existing designation information acquired by the stored information acquiring unit 145 from the storage unit 110.

(Step S125) The information check unit 146 determines whether or not the compared relationships are different from each other. If they are different from each other, the procedure advances to step S126, and, if otherwise, the procedure advances to step S127.

(Step S126) The change notification information output unit 163 outputs change notification information indicating that the relationship corresponding to newly acquired anti-social information is different from the relationship indicated by the existing designation information. The procedure advances to step S127.

(Step S127) The processing unit 140 determines whether or not the counter i matches the total number of pieces of business card information or the like acquired in step S121. If i matches the total number of pieces of acquired business card information or the like, the check processing is ended, and the procedure returns to the processing shown in FIG. 5, and, if otherwise, the procedure advances to step S128.

(Step S128) The processing unit 140 increments the counter i by 1. The procedure returns to step S122.

Figure 7:
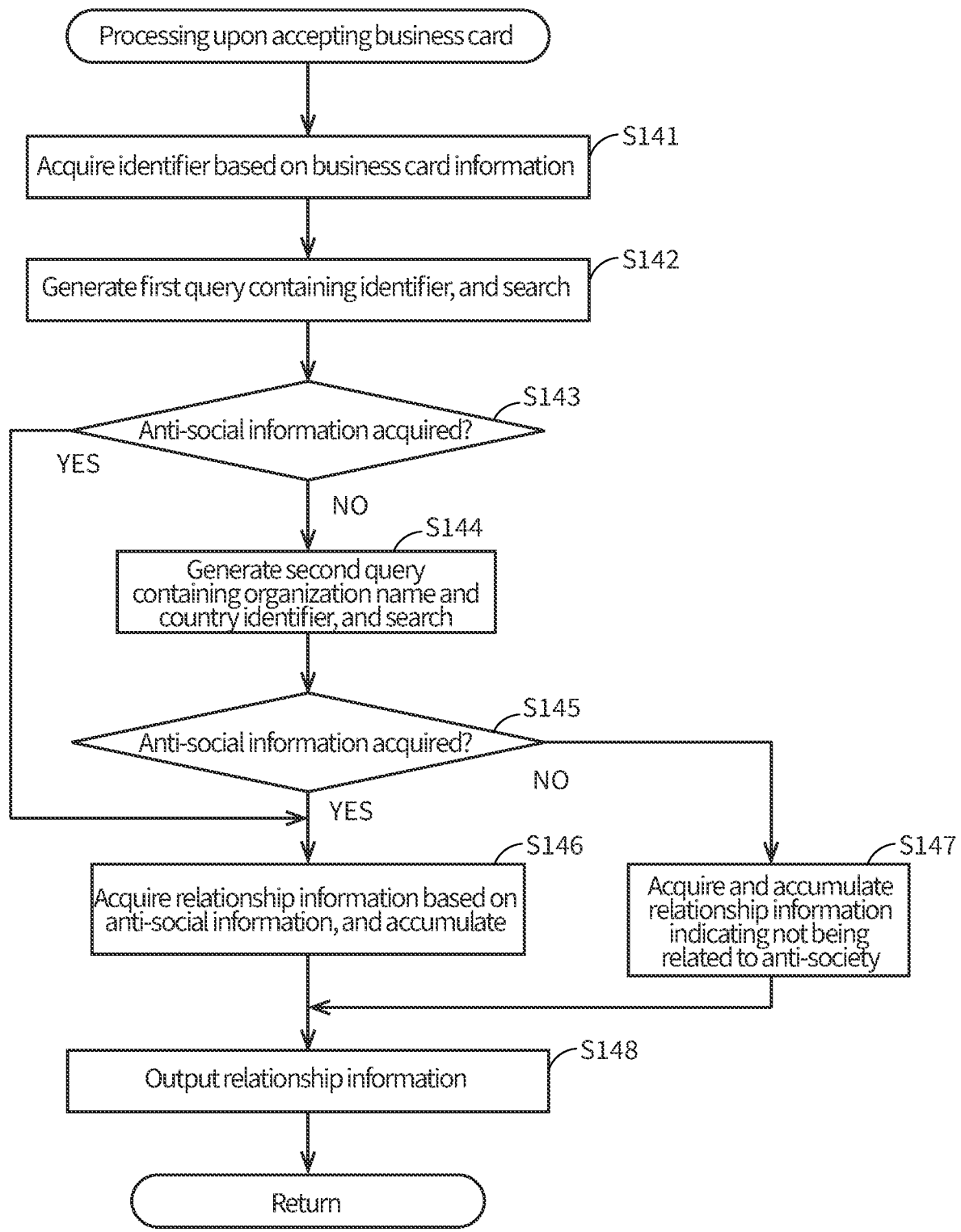
FIG. 7 is a flowchart showing an example of processing that is performed by the information processing apparatus upon accepting a business card in the embodiment.

FIG. 7 is a flowchart showing an example of processing that is performed by the information processing apparatus 100 upon accepting a business card.

(Step S141) The business card information processing unit 151 acquires business card information accepted by the business card information accepting unit 131, and acquires an identifier regarding the business card information.

(Step S142) The first search unit 152 generates a first query containing the organization identifier acquired by the business card information processing unit 151. Then, the first search unit 152 searches the anti-social check database 912 using the generated first query. In the case in which there is anti-social information corresponding to the organization identifier contained in the anti-social check database 912, the anti-social information acquiring unit 141 acquires the anti-social information.

(Step S143) The anti-social information acquiring unit 141 determines whether or not anti-social information has been acquired through a search by the first search unit 152. If anti-social information has been acquired, the procedure advances to step S145, and, if otherwise, the procedure advances to step S144.

(Step S144) The second search unit 153 generates a second query containing an organization name acquired from the business card information and a country identifier corresponding thereto. Then, the anti-social check database 912 is searched using the generated second query. In the case in which there is anti-social information corresponding to the organization name acquired from the business card information and the country identifier, the anti-social information acquiring unit 141 acquires the anti-social information.

(Step S145) The anti-social information acquiring unit 141 determines whether or not anti-social information has been acquired through a search by the second search unit 153. If anti-social information has been acquired, the procedure advances to step S146, and, if otherwise, the procedure advances to step S147.

(Step S146) The relationship information acquiring unit 142 acquires relationship information indicating a relationship between the business card and an anti-social force, based on the anti-social information acquired by the anti-social information acquiring unit 141. The relationship information accumulating unit 143 accumulates the relationship information acquired by the relationship information acquiring unit 142, in the business card information storage unit 113.

(Step S147) On the other hand, if anti-social information has not been acquired, in this embodiment, the relationship information acquiring unit 142 acquires relationship information indicating that there is no relationship between the business card information and anti-social forces. The relationship information accumulating unit 143 accumulates the relationship information acquired by the relationship information acquiring unit 142, in the business card information storage unit 113.

(Step S148) The relationship information output unit 161 outputs the relationship information acquired by the relationship information acquiring unit 142. Subsequently, the procedure returns to the processing shown in FIG. 5.

Figure 8:
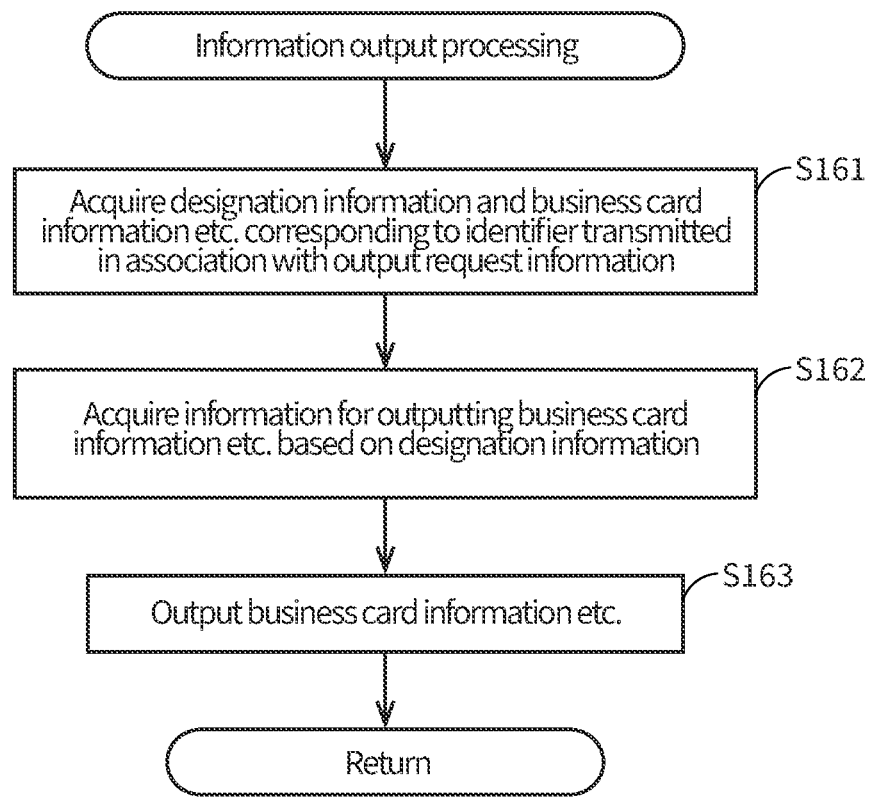
FIG. 8 is a flowchart showing an example of information output processing that is performed by the information processing apparatus in the embodiment.

FIG. 8 is a flowchart showing an example of information output processing that is performed by the information processing apparatus 100.

(Step S161) The stored information acquiring unit 145 acquires, based on an identifier associated with the output request information accepted by the output request accepting unit 133, designation information and business card information or the like corresponding to the identifier, from the business card information storage unit 113.

(Step S162) The stored information output unit 162 acquires information for outputting the acquired business card information, based on the designation information. For example, if the designation information indicates prohibited matters in transactions, images or other types of information for displaying a predetermined mark indicating that effect are acquired.

(Step S163) The stored information output unit 162 outputs the business card information or the like, using the acquired information. That is to say, the stored information output unit 162 outputs the business card information or the like, in a form that conforms to the designation information acquired by the stored information acquiring unit 145. Subsequently, the procedure returns to the processing shown in FIG. 5.

Hereinafter, specific examples of the anti-social check function using the information processing apparatus 100 will be described.

FIG. 9 is a diagram showing a specific example of part of information that is recorded in the anti-social check database 912.

As shown in FIG. 9, in this embodiment, for example, attribute values of an organization name, an organization identifier (ID), a country identifier, and anti-social information are recorded in association with each other in the anti-social check database 912. In the drawing, anti-social information indicates whether or not an organization belongs to an anti-social force, by character strings, but there is no limitation to this. In addition to those mentioned above, a full name of a person, a personal identifier, information regarding an organization such as an address, and the like may also be contained. It is also possible that the organization identifier or any other attribute values are not contained.

FIG. 10 is a diagram showing an example of information that is stored in the business card information storage unit 113 in the information processing apparatus 100.

As shown in FIG. 10, in this embodiment, for example, business card information or the like constituted by a business card identifier, a user identifier of a user who owns a business card, a full name of a person indicated on a business card, a name of an organization to which a person belongs, an organization identifier, a country identifier, transaction history information, an organization address, and the like, anti-social information, relationship information, and designation information are recorded in association with each other in the business card information storage unit 113. It is seen that, out of the pieces of business card information or the like, for example, a business card identifier, a full name, an organization name, an organization identifier, a country identifier, and an organization address correspond to the business card information, but information other than those mentioned above may be contained in the business card information, or some of these pieces of information may not be contained in the business card information.

In the example shown in the drawing, the organization identifier is, for example, information acquired by the business card information processing unit 151. The anti-social information for each organization is information that is acquired by the anti-social check database 912 based on the organization identifier. The relationship information is information that is acquired based on the anti-social information and is output. The relationship information indicates whether or not an organization is related to an anti-social force, by character strings, but there is no limitation to this. The designation information in this embodiment is information indicating a prohibited matter in a transaction based on a relationship between a business card and an anti-social force, the information being input by an administrative user. For an organization for which no designation information has been input, for example, attribute values of the designation information may not be contained. For an organization without input, a default value may be designated, or a value corresponding to the relationship information may be designated.

As shown in the drawing, the processing unit 140 acquires anti-social information from the anti-social check database 912 based on the business card information, and stores it in association with the relationship information and the designation information. Accordingly, if the output request information is accepted by the output request accepting unit 133, detailed business card information or the like regarding the organization can be output together with the designation information and the like, based on the identifier (e.g., the organization identifier) associated with the output request information.

FIG. 11 is a diagram illustrating a specific example of an output result through an anti-social check function using the information processing apparatus 100.

FIG. 11 shows an example of a screen displayed on the terminal apparatus 600 that is used by a user, for example, when the user transmits output request information regarding "Company AAA".

As shown in FIG. 11, if "Company AAA" associated with the output request information is associated with designation information indicating that the organization is related to an anti-social force, that is, if a prohibited matter in a transaction is designated, the business card information or the like of the organization is displayed on the terminal apparatus 600 in a display form indicating that the organization is related to an anti-social force. That is to say, the screen displays an image illustrating that transactions are not allowed or that Company AAA is related to an anti-social force, in a form that can be easily seen by the user. However, the display form is not limited to this.

FIG. 12 is a diagram illustrating a specific example of a designation screen for accepting input of designation information output by the information processing apparatus 100.

The screen shown in FIG. 12 lists and displays the business card information for which the relationship information is acquired. It is also possible that the business card information for which the designation information has not been input (evaluation has not been performed) yet by the user is displayed in the upper portion. In the example shown in the drawing, the designation information automatically selected for each organization based on the relationship information is displayed, and it is possible to change the content of the designation information ("Status") by performing an operation that selects an organization whose content is to be edited (an operation that presses "Edit" in the drawing). Specifically, for example, it is possible to change the content of the designation information and input the designation information, by toggling a radio button and performing an operation that decides on the content (an operation that presses "Save" in the drawing) in the toggled state.

In this embodiment, it is also possible that the designation screen has a "Remarks" space for accepting input of additional information when the user inputs the designation information. The content described in the "Remarks" space may be accepted together with the designation information by the designation information accepting unit 132 in association with the corresponding organization identifier or the like. Then, the designation information accumulating unit 144 may take the judgement reasons or the like when the user inputs the designation information as the additional information, and accumulate it together with the designation information. If the accumulated additional information is output together with the designation information and the like in response to output request information, the user who receives the output information can see additional information such as specific judgement reasons and backgrounds, in addition to the information regarding the relationship between the organizations and the like and anti-social forces in the designation information.

As described above, according to this embodiment, the information processing apparatus 100 accepts business card information, and automatically acquires and outputs relationship information. Accordingly, it is possible to significantly reduce the effort required for a user when checking relationships between business cards and anti-social organizations by themselves based on the information contained in the business cards. Accordingly, it is possible to easily and reliably check relationships between business cards and anti-social forces such that overlooking is unlikely to occur. With use of the information processing apparatus 100 with this configuration, it is possible to determine whether or not the other party is related to an anti-social force, based on a search result of anti-social check data, and to reduce the influence of the subjective view of a person in charge of the check. Accordingly, it is possible to prevent the judgment result of anti-social check from depending on people.

Furthermore, the anti-social check database 912 can be searched, for example, using an organization identifier or a personal identifier. Accordingly, even when there are spelling inconsistencies in text indicated on business cards or descriptions of business card information read therefrom, it is possible to accept them as tolerable errors, and to easily and reliably acquire anti-social information. Furthermore, if the search using the first query using an organization identifier or the like fails to acquire anti-social information, a search using the second query containing an organization name and a country identifier is performed, and thus it is possible to increase the possibility that the anti-social information can be acquired through a search by the anti-social check database 912, and to more easily check relationships between business cards and anti-social forces.

If the relationship information is acquired, the designation information input by a user can be accepted and stored in association with the business card information or the like. Accordingly, it is possible to accumulate check results with high reliability obtained through user's check. It is possible to improve the efficiency of the operation that outputs information as to whether or not transactions are allowed, to other users.

If input of the output request information is accepted, business card information or the like is accordingly output in a form that conforms to the designation information. Accordingly, it is possible for a user who transmitted the output request information to easily see relationships between the business card information and anti-social forces.

When a predetermined check time has arrived, a relationship indicated by existing designation information or relationship information and a relationship corresponding to newly acquired anti-social information are compared, and, if they are different from each other, change notification information is output. Accordingly, in the case in which the content of the anti-social information based on which it is determined whether or not an organization is related to an anti-social force is changed in the anti-social check database 912, if the change in the anti-social information is related to the content of the existing designation information or relationship information, it is possible for the user to promptly see that change and to perform operations as necessary.

The processing in this embodiment may be realized by software. The software may be distributed by software downloads or the like. Furthermore, the software may be distributed in a form where the software is stored in a storage medium such as a CD-ROM. The software that realizes the information processing apparatus 100 in this embodiment is the following sort of program. Specifically, this program is a program that is executed on a computer in the information processing apparatus 100, for causing the computer in the information processing apparatus 100 to function as: a business card information accepting unit that accepts business card information regarding a business card; an anti-social information acquiring unit that acquires anti-social information regarding an anti-social force, the anti-social information being one or more attribute values corresponding to an identifier contained in an anti-social check database, using an identifier regarding the business card information accepted by the business card information accepting unit; and a relationship information output unit that outputs relationship information indicating a relationship between the business card and the anti-social force based on the acquired anti-social information.

In the foregoing embodiments, if the relationship information is acquired, input of the designation information may not be accepted. In this case, if the output request information is accepted, for example, the following operation may be performed. That is to say, the stored information acquiring unit 145 acquires business card information or the like and relationship information accumulated in the storage unit 110 by the relationship information accumulating unit 143, based on the identifier associated with the output request information. Then, the stored information output unit 162 outputs the business card information or the like and the relationship information. In this case, the stored information output unit 162 may output the business card information or the like, in a form that conforms to the relationship information acquired by the stored information acquiring unit 145.

In the case in which the relationship information and the business card information or the like are stored in the storage unit 110 so as to be output in response to output request information in this manner, it is also possible to perform the following operation every time a predetermined check time arrives. That is to say, for example, the stored information acquiring unit 145 acquires multiple combinations of a piece of relationship information and an identifier regarding business card information corresponding to the relationship information, from the storage unit 110, every time a predetermined check time arrives at which the anti-social information re-acquiring unit 154 acquires anti-social information. Then, the information check unit 146 compares a relationship indicated by relationship information that can be output by the relationship information output unit 161 based on the acquired anti-social information and a relationship indicated by the existing relationship information acquired by the stored information acquiring unit 145 from the storage unit 110. In the case in which the information check unit 146 determines that the relationship indicated by the relationship information acquired by the relationship information acquiring unit 142 is different from the relationship indicated by the existing relationship information, the change notification information output unit 163 outputs change notification information indicating that effect. When a predetermined check time has arrived, anti-social information corresponding to an identifier regarding business card information corresponding to the relationship information acquired by the stored information acquiring unit 145 may be acquired by the anti-social information re-acquiring unit 154, or relationship information corresponding to an identifier contained in the query that was used by the anti-social information re-acquiring unit 154 to acquire the anti-social information may be acquired by the stored information acquiring unit 145.

In this manner, also in the case of outputting the relationship information without accepting input of designation information, it is possible to easily output information indicating relationships between business cards and anti-social forces, and to check relationships between business cards and anti-social forces. Also in the case in which the anti-social information in the anti-social check database 912 is updated, it is possible for a user to easily see that the relationship indicated by the existing relationship information already acquired has been changed, every time a predetermined check time has arrived.

Furthermore, if the business card information accepting unit 131 receives a user identifier of a user who owns a business card associated with the business card information, the output unit 160 may automatically output the content of relationship information corresponding to the business card information, the designation information, and the like to the user, based on the information stored in the storage unit 110 such as the business card information storage unit 113. For example, if information is output by way of various notifying parts such as a notification through an email or a so-called push notification, it is possible for the user who owns the business card to promptly see whether or not there is a risk, a prohibited matter, or the like in a transaction with a person or an organization indicated on the business card.

Furthermore, if the business card information accepting unit 131 receives a user identifier of a user who owns a business card associated with the business card information, the processing unit 140 may check whether or not there is existing relationship information or designation information regarding the business card information in the storage unit 110 such as the business card information storage unit 113. Then, if there is existing relationship information or designation information regarding the business card information, that is, if business card information regarding the same business card, person, organization, or the like has been accepted twice or more, the processing by the anti-social information acquiring unit 141 may not be newly performed. Accordingly, it is possible to reduce the load of the information processing apparatus 100 and the first external apparatus 910. In this case, if the existing relationship information or designation information regarding the business card information indicates that there is a risk or prohibited matter, the output unit 160 may automatically output the content to the user who owns the business card. Accordingly, it is possible for the user who owns the business card to promptly see whether or not there is a risk, a prohibited matter, or the like in a transaction with a person or an organization indicated on the business card.

Others

Figure 13:
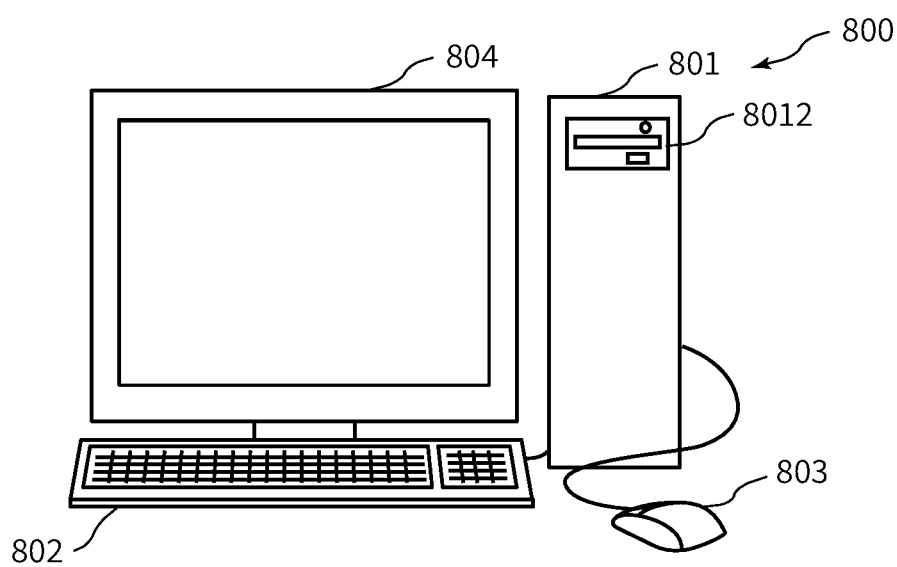
FIG. 13 is a schematic view of a computer system in the embodiment.
Figure 14:
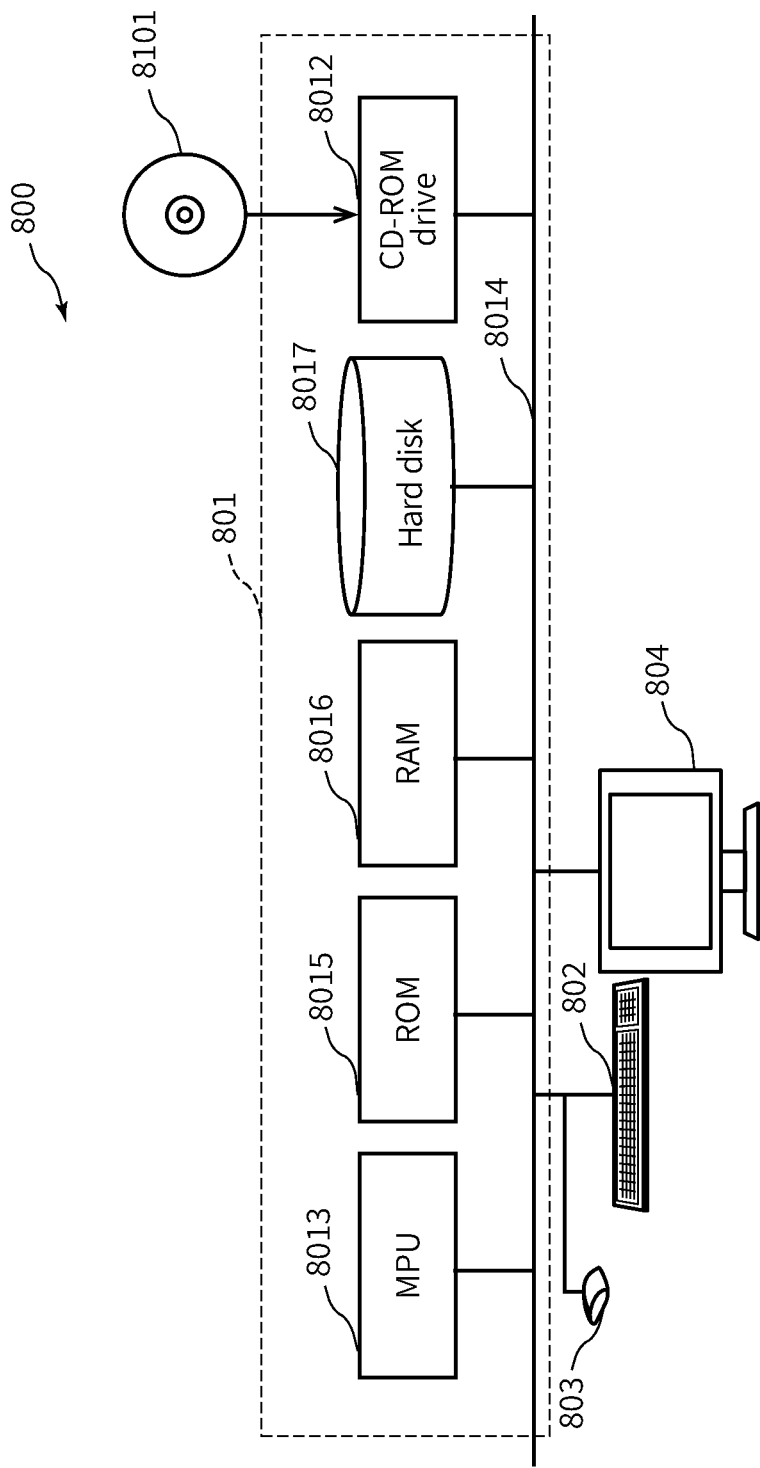
FIG. 14 is a block diagram of the computer system.

FIG. 13 is a schematic view of a computer system 800 in the foregoing embodiments. FIG. 14 is a block diagram of the computer system 800 in the foregoing embodiments.

These drawings shows the configuration of a computer that executes the program described in this specification to realize the information processing apparatus and the like in the foregoing embodiments. The foregoing embodiments may be realized using computer hardware and a computer program executed thereon.

The computer system 800 includes a computer 801 including a CD-ROM drive, a keyboard 802, a mouse 803, and a monitor 804.

The computer 801 includes, in addition to the CD-ROM drive 8012, an MPU 8013, a bus 8014 connected to the CD-ROM drive 8012 and the like, a ROM 8015 in which a program such as a boot up program is stored, a RAM 8016 that is connected to the MPU 8013 and is a memory in which a command of an application program is temporarily stored and a temporary storage area is provided, and a hard disk 8017 in which an application program, a system program, and data are stored. Although not shown, the computer 801 may further include a network card that provides connection to a LAN.

The program for causing the computer system 800 to execute the functions of the information processing apparatus and the like in the foregoing embodiments may be stored in a CD-ROM 8101 that is inserted into the CD-ROM drive 8012, and be transmitted to the hard disk 8017. Alternatively, the program may be transmitted via a network (not shown) to the computer 801 and stored in the hard disk 8017. At the time of execution, the program is loaded into the RAM 8016. The program may be loaded from the CD-ROM 8101, or directly from a network.

The program does not necessarily have to include, for example, an operating system (OS) or a third party program to cause the computer 801 to execute the functions of the information processing apparatus and the like in the foregoing embodiments. The program may only include a command portion to call an appropriate function (module) in a controlled mode and obtain desired results. The manner in which the computer system 800 operates is well known, and thus a detailed description thereof has been omitted.

It should be noted that, in the program, in a transmitting step of transmitting information, a receiving step of receiving information, or the like, processing that is performed by hardware, for example, processing performed by a modem or an interface card in the transmitting step (processing that can be performed only by hardware) is not included.

Furthermore, in the foregoing embodiments, information transmission performed between constituent elements may be such that, for example, if two constituent elements for transmitting information are physically different from each other, the transmission is performed by one of the constituent elements outputting the information and the other constituent element accepting the information, or alternatively, if two constituent elements for transmitting information are physically the same, the transmission is performed by shifting from a processing phase corresponding to one of the constituent elements to a processing phase corresponding to the other constituent element.

Furthermore, in the foregoing embodiments, information related to the processing that is performed by each constituent element, for example, information that is to be accepted, acquired, selected, generated, transmitted, or received by each constituent element, information such as a threshold value, a numerical expression, or an address used by each constituent element in the processing and the like may be retained in an unshown storage medium temporarily or for a long period of time even if not specified in the description above. Furthermore, the information may be accumulated in the unshown storage medium by each constituent element or by an unshown accumulating unit. Furthermore, the information may be read from the unshown storage medium by each constituent element or by an unshown reading unit.

Furthermore, in the foregoing embodiments, if information used in each constituent element or the like, for example, information such as a threshold value, an address, or various setting values used in each constituent element in the processing may be changed by a user, the user may be or may not be allowed to change such information as appropriate even if not specified in the description above. If the user is allowed to change such information, the change may be realized by, for example, an unshown accepting unit that accepts a change instruction from the user and an unshown changing unit that changes information according to the change instruction. The unshown accepting unit may accept the change instruction, for example, by accepting information from an input device, by receiving information transmitted via a communication line, or by accepting information read from a predetermined storage medium.

The present invention is not limited to the embodiments set forth herein. Various modifications are possible within the scope of the invention.

The configurations of the foregoing embodiments are not limited to those described above, and constituent elements of each of the foregoing embodiments may be replaced by or combined with constituent elements of another embodiments as appropriate. Some of the constituent elements or the functions may be omitted in the foregoing embodiments.

The databases described in the foregoing embodiments may be realized by multiple databases that are linked to each other, and these multiple databases may be located in a distributed manner in different sets of hardware or apparatuses. For example, an attribute value described as being contained in a record of a database may be an attribute value contained in another database linked to the database.

In the foregoing embodiments, each process (each function) may be realized as centralized processing using a single apparatus (system), or may be realized as distributed processing using multiple apparatuses (in this case, the entire system constituted by multiple apparatuses that perform distributed processing may be regarded as one "apparatus").

As described above, the information processing apparatus according to the present invention has the effect of making it possible to easily and reliably check relationships between business cards and anti-social forces such that overlooking is unlikely to occur, and thus this apparatus is useful as an information processing apparatus and the like.

What is claimed is:

1. An information processing apparatus comprising:
a business card information accepting unit that accepts business card information regarding a business card;
an anti-social information acquiring unit that searches for information regarding an anti-social force contained in an anti-social check database, using an identifier regarding the business card information accepted by the business card information accepting unit, thereby acquiring anti-social information based on a search result; and
a relationship information output unit that outputs relationship information indicating a relationship between the business card and the anti-social force based on the acquired anti-social information, wherein:
the anti-social force is such a party that a transaction with the party is prohibited in general societal terms or a transaction with the party has a risk, and
the anti-social information contains information indicating a relationship between an organization to which a person indicated on the business card belongs and the anti-social force.

2. The information processing apparatus according to claim 1,
wherein an organization identifier, which is code for identifying an organization, and the anti-social information are stored in association with each other in the anti-social check database, and
the anti-social information acquiring unit acquires an organization identifier for identifying an organization to which a person indicated on the business card belongs, from the business card information, generates a query containing the acquired organization identifier, and acquires anti-social information corresponding to the organization identifier contained in the anti-social check database, using the generated query.

3. The information processing apparatus according to claim 2,
wherein the organization identifier, the anti-social information, an organization name, and a country identifier for specifying a country corresponding to an organization are stored in association with each other in the anti-social check database, and
the anti-social information acquiring unit makes an inquiry to the anti-social check database using a first query containing the organization identifier, and, in a case in which anti-social information corresponding to the organization identifier is not acquired through the inquiry using the first query, the anti-social information acquiring unit generates a second query containing an organization name and a country identifier acquired based on the business card information, and acquires anti-social information corresponding to the organization name and the country identifier contained in the anti-social check database, using the generated second query.

4. The information processing apparatus according to claim 1,
wherein a personal identifier, which is code for identifying a person, and the anti-social information are stored in association with each other in the anti-social check database, and
the anti-social information acquiring unit acquires a personal identifier for identifying a person indicated on the business card, from the business card information, generates a query containing the acquired personal identifier, and acquires anti-social information corresponding to the personal identifier contained in the anti-social check database, using the generated query.

5. The information processing apparatus according to claim 1,
wherein the relationship information output unit is configured to output the relationship information to a user, and the information processing apparatus further comprises:
- a designation information accepting unit that, in a case in which the relationship information output unit outputs the relationship information to the user, accepts input of designation information, from the user, indicating a relationship between the business card and an anti-social force, and associates the designation information with an identifier regarding business card information corresponding to the relationship information; and
- a designation information accumulating unit that accumulates the designation information, and the business card information accepted by the business card information accepting unit or information corresponding thereto in association with each other in a storage unit, based on the identifier associated with the designation information accepted by the designation information accepting unit.

6. The information processing apparatus according to claim 5, further comprising:
- an output request accepting unit that accepts input of output request information, from the user, requesting output of the business card information accepted by the business card information accepting unit or information corresponding thereto, and associates the accepted output request information with an identifier regarding the business card information;
- a stored information acquiring unit that acquires, based on the identifier associated with the output request information accepted by the output request accepting unit, the designation information and the business card information or information corresponding thereto corresponding to the identifier, from the storage unit; and
- a stored information output unit that outputs the business card information or information corresponding thereto acquired by the stored information acquiring unit, in a form that conforms to the designation information acquired by the stored information acquiring unit.

7. The information processing apparatus according to claim 5,
wherein the stored information acquiring unit can acquire a piece of the designation information, and the identifier regarding the business card information corresponding to the designation information, from the storage unit, and
the information processing apparatus further comprises:
- an anti-social information re-acquiring unit that acquires the anti-social information contained in the anti-social check database, using the identifier regarding the business card information acquired by the stored information acquiring unit, when a predetermined check time has arrived; and
- a change notification information output unit that, in a case in which a relationship indicated by relationship information that can be output by the relationship information output unit based on the anti-social information acquired by the anti-social information re-acquiring unit is different from a relationship indicated by the designation information, outputs change notification information indicating that effect.

8. The information processing apparatus according to claim 1, further comprising:
- a relationship information accumulating unit that accumulates the relationship information output by the relationship information output unit and an identifier regarding business card information corresponding to the relationship information in association with each other in a storage unit;
- a stored information acquiring unit that acquires a piece of the relationship information, and the identifier regarding the business card information corresponding to the relationship information, from the storage unit;
- an anti-social information re-acquiring unit that acquires the anti-social information contained in the anti-social check database, using the identifier regarding the business card information acquired by the stored information acquiring unit, when a predetermined check time has arrived; and
- a change notification information output unit that, in a case in which a relationship indicated by relationship information that can be output by the relationship information output unit based on the anti-social information acquired by the anti-social information re-acquiring unit is different from a relationship indicated by the relationship information acquired by the stored information acquiring unit, outputs change notification information indicating that effect.

9. An information processing method realized using a business card information accepting unit, an anti-social information acquiring unit, and a relationship information output unit, comprising:
- a business card information accepting step of the business card information accepting unit accepting business card information regarding a business card;
- an anti-social information acquiring step of the anti-social information acquiring unit searching for information regarding an anti-social force contained in an anti-social check database, using an identifier regarding the business card information accepted by the business card information accepting unit, thereby acquiring anti-social information based on a search result; and
- a relationship information output step of the relationship information output unit outputting relationship information indicating a relationship between the business card and the anti-social force based on the acquired anti-social information, wherein:
the anti-social force is such a party that a transaction with the party is prohibited in general societal terms or a transaction with the party has a risk, and
the anti-social information contains information indicating a relationship between an organization to which a person indicated on the business card belongs and the anti-social force.

10. The information processing method according to claim 9, wherein:
an organization identifier, which is code for identifying an organization, and the anti-social information are stored in association with each other in the anti-social check database, and
in the anti-social information acquiring step, an organization identifier for identifying an organization to which a person indicated on the business card belongs is acquired from the business card information, a query containing the acquired organization identifier is generated, and anti-social information corresponding to the organization identifier contained in the anti-social check database is acquired using the generated query.

11. A non-transitory computer readable medium storing a program for causing a computer including a business card information accepting unit that accepts business card information regarding a business card, to function as:

an anti-social information acquiring unit that searches for information regarding an anti-social force contained in an anti-social check database, using an identifier regarding the business card information accepted by the business card information accepting unit, thereby acquiring anti-social information based on a search result; and a relationship information output unit that outputs relationship information indicating a relationship between the business card and the anti-social force based on the acquired anti-social information, wherein:

the anti-social force is such a party that a transaction with the party is prohibited in general societal terms or a transaction with the party has a risk, and the anti-social information contains information indicating a relationship between an organization to which a person indicated on the business card belongs and the anti-social force.

12. The non-transitory computer readable medium according to claim 11, wherein:

an organization identifier, which is code for identifying an organization, and the anti-social information are stored in association with each other in the anti-social check database, and the anti-social information acquiring unit acquires an organization identifier for identifying an organization to which a person indicated on the business card belongs, from the business card information, generates a query containing the acquired organization identifier, and acquires anti-social information corresponding to the organization identifier contained in the anti-social check database, using the generated query.

* * * * *